US012304784B2

(12) United States Patent
Dietz

(10) Patent No.: US 12,304,784 B2
(45) Date of Patent: May 20, 2025

(54) CEILING FIXTURE ACCESSIBILITY DEVICE

(71) Applicant: Seas II Day, LLC, Middle Haddam, CT (US)

(72) Inventor: Robert M. Dietz, Middle Haddam, CT (US)

(73) Assignee: SEAS II DAY, LLC, Middle Haddam, CT (US)

( * ) Notice: Subject to any disclaimer, the term of this patent is extended or adjusted under 35 U.S.C. 154(b) by 0 days.

(21) Appl. No.: 18/378,999

(22) Filed: Oct. 11, 2023

(65) Prior Publication Data

US 2024/0043252 A1 Feb. 8, 2024

Related U.S. Application Data

(63) Continuation of application No. 18/126,662, filed on Mar. 27, 2023, now Pat. No. 11,840,432, which is a continuation-in-part of application No. PCT/US2022/021054, filed on Mar. 20, 2022.

(60) Provisional application No. 63/407,033, filed on Sep. 15, 2022, provisional application No. 63/163,787, filed on Mar. 20, 2021.

(51) Int. Cl.

| | |
|---|---|
| ***F21V 21/38*** | (2006.01) |
| ***B66D 1/60*** | (2006.01) |
| ***F04D 29/60*** | (2006.01) |
| ***F21V 21/03*** | (2006.01) |

(52) U.S. Cl.

CPC ............. *B66D 1/60* (2013.01); *F04D 29/601* (2013.01); *F21V 21/03* (2013.01); *F21V 21/38* (2013.01)

(58) Field of Classification Search

CPC . F21V 21/38; F21V 21/03; B66D 1/60; F21S 8/028; F21S 8/061; F04D 29/601

See application file for complete search history.

(56) References Cited

U.S. PATENT DOCUMENTS 468,413 A * 2/1892 Pfluger .................. F21V 21/38 200/2
854,827 A * 5/1907 Kuhne .................. F21V 21/38 200/2
2,334,139 A * 11/1943 Wilson .................. F21V 21/38 248/320

(Continued)

FOREIGN PATENT DOCUMENTS

CN 2876551 Y 3/2007
CN 208249633 U 12/2018

(Continued)

OTHER PUBLICATIONS

EP Extended Search Report for corresponding EP Application No. 22776371 dated Jan. 17, 2025.

*Primary Examiner* — Bradley Duckworth

(74) *Attorney, Agent, or Firm* — Wiggin and Dana LLP

(57) ABSTRACT

The present invention provides a remote-controlled, retractable accessibility device for ceiling and wall fixtures, such as for lighting fixtures, ceiling fans, speakers, mobiles, and the like. The device allows for the raising and lowering of the fixture via a remote wireless or wired control. The device is designed with electrical connectors that automatically disengage and reengage to cut off the flow of electricity when the fixture is lowered so that the fixture can be safely accessed.

25 Claims, 39 Drawing Sheets

(56) References Cited

U.S. PATENT DOCUMENTS

| | | | | | |
|---|---|---|---|---|---|
| 2,773,975 | A * | 12/1956 | Farrington | F21V 21/38 | 254/269 |
| 3,949,842 | A * | 4/1976 | Kiehn | F16D 63/008 | 188/189 |
| 4,429,355 | A * | 1/1984 | Garchinsky | F21V 21/38 | 362/418 |
| 5,105,349 | A * | 4/1992 | Falls | F21V 21/03 | 248/329 |
| 5,519,597 | A * | 5/1996 | Tsai | F21V 21/38 | 362/403 |
| 6,142,439 | A * | 11/2000 | Aramaki | B66D 1/60 | 248/327 |
| 7,410,150 | B1 * | 8/2008 | Falls | B66D 1/56 | 248/329 |
| 8,215,618 | B2 * | 7/2012 | Kochan | B66D 1/14 | 362/404 |
| 8,348,215 | B1 * | 1/2013 | Smith | F04D 25/088 | 242/390.8 |
| 8,733,985 | B2 * | 5/2014 | Storm | F21S 8/026 | 362/403 |
| 11,247,881 | B2 * | 2/2022 | Shin | F21S 8/061 | |
| 11,453,579 | B2 * | 9/2022 | Chacon | G06F 16/901 | |
| 11,473,762 | B2 * | 10/2022 | Kim | F24F 13/078 | |
| 11,613,450 | B2 * | 3/2023 | Jang | B66D 1/12 | 254/333 |
| 11,840,432 | B2 * | 12/2023 | Dietz | F21V 21/15 | |
| 2006/0114681 | A1 * | 6/2006 | Wang | F21V 21/22 | 362/418 |
| 2008/0193291 | A1 * | 8/2008 | Ware | F04D 29/601 | 416/5 |
| 2010/0227499 | A1 * | 9/2010 | Ramos | H02G 3/20 | 439/537 |
| 2012/0305731 | A1 * | 12/2012 | Yearsley | F04D 25/088 | 248/329 |
| 2013/0044501 | A1 * | 2/2013 | Rudisill | F21V 29/70 | 362/398 |

FOREIGN PATENT DOCUMENTS

| | | | |
|---|---|---|---|
| JP | 4530903 | B2 | 8/2010 |
| JP | 5232684 | B2 | 7/2013 |

* cited by examiner

CEILING FIXTURE ACCESSIBILITY DEVICE

CROSS-REFERENCE TO RELATED APPLICATIONS

This application is a continuation of U.S. Nonprovisional patent application Ser. No. 18/126,662, filed Mar. 27, 2023, which is a continuation-in-part of International Patent Application No. PCT/US2022/021054, filed Mar. 20, 2022, which claims priority to U.S. Provisional Patent Application No. 63/163,787, filed Mar. 20, 2021, and this application also claims priority to U.S. Provisional Patent Application No. 63/407,033, filed Sep. 15, 2022, each of which are hereby incorporated by reference in their entirety herein.

TECHNICAL FIELD

The present invention provides a remote-controlled, retractable accessibility device for ceiling and wall fixtures, such as for lighting fixtures, ceiling fans, and other electrical devices, and the like. The device allows for the raising and lowering of the fixture via a wireless control. The core of the device is a hoist system contained in a housing, which, via a motorized multi-channel pulley or, alternatively, pulley array, allows for the lowering and raising of the fixture. The device is designed with electrical connectors, such as male/female electrical connectors, that automatically disengage to cut off the flow of electricity when the fixture is lowered so that the fixture can be safely accessed when in the lowered position and automatically engaged to restore the flow of electricity when raised.

BACKGROUND

In the home, business, and other environments, there are many electrical fixtures located on ceilings, walls, and other structures where they are out of arm's reach for servicing, maintenance, and cleaning. These fixtures include lighting fixtures, ceiling fans, speakers, monitors, mobiles, displays, artistic creations, and such. A common problem is the maintenance and cleaning of these fixtures, such as the replacement of a light bulb in a lighting fixture or the removal of dust from the blades of a ceiling fan. Maintenance and cleaning can be inconvenient, and even hazardous, if special equipment and tall ladders are required. Furthermore, there are potential electrical hazards if the maintenance is performed on a "hot" fixture if the electrical supply has not been cut off from the fixture. These problems are further compounded when there are multiple fixtures to deal with, particularly in a commercial or office setting.

The present solutions to these maintenance and cleaning challenges are not ideal. For example, one could attempt to handle the maintenance and cleaning oneself and assume the risk of injury from falls and contact with live electrical components. Alternatively, one could purchase or rent expensive accessibility equipment such as scaffolds, special ladders, and motorized cherry pickers. Yet alternatively, one could hire a professional to perform the maintenance and cleaning, often at significant expense and on the time schedule of the professional.

Various solutions for solving these maintenance and cleaning challenges have been proposed. See, for example, U.S. Pat. No. 8,348,215, to Smith, issued Jan. 8, 2013; US Patent Application Publication No. 2012/0305731, to Yearsley, published Dec. 6, 2012; US Patent Application Publication No. 2010/0227499, to Ramos et al., published Sep. 9, 2010; US Patent Application Publication No. 2008/0193291, to Ware, published Aug. 14, 2008; and US Patent Application Publication No. 2006/0114681, to Wang, published Jun. 1, 2006. However, these solutions are not fully acceptable for providing a safe and convenient means for maintenance and cleaning.

Moreover, the mounting of a fixture on a non-horizontal or angled surface presents additional challenges for which previously proposed solutions are inadequate. For example, the above-mentioned U.S. Pat. No. 8,348,215 would require the user to provide an external swivel arm to properly align stationary and moveable components. Another solution as disclosed in US Pat. Publ. No. 2012/0305731 would be applicable to only a narrow range of angled installations and further requires the use of a complicated and expensive clutch mechanism.

The present invention overcomes the disadvantages and limitations of other proposed solutions and provides an accessibility device for safe, convenient, and cost-effective means to service, maintain, and clean a wide array of normally inaccessible ceiling and wall fixtures. Furthermore, these devices are adaptable for both new construction installation as well as for aftermarket installation to modify existing fixtures.

SUMMARY

The present invention provides a remote-controlled, descendable and retractable accessibility device for ceiling and wall fixtures.

In some embodiments, the present disclosure provides for an electrical fixture accessibility device comprising:

a. a stationary component mountable on a ceiling (or other above-ground surface), comprising:
- a multi-channel (or multi-groove or multi-trench) spool comprising a plurality (i.e. two or more and in particular embodiments three or more) of channels (or grooves or trenches);
- a plurality of support cables, a first end of each of the plurality of support cables being associated with one of the plurality of channels on the multi-channel spool;
- a drive mechanism coupled to the multi-channel spool, wherein the drive mechanism is configured to rotate the spool to wind or unwind each of the plurality of support cables from their respective channels; and
- a first electrical connector, and b. a movable component (that attaches to the electrical fixture) comprising:
- a connection to a second end of each of the plurality of support cables;
- a second electrical connector complementary to and releasably engageable with and releasably retractable from the first electrical connector (when the movable component is respectively fully or sufficiently engaged with or retracted from the stationary component); and
- a junction to an electrical fixture wherein the movable component is movable in a direction descending from the ceiling when the drive mechanism rotates the spool to unwind the support cables, and wherein the movable component is movable in a direction ascending toward the ceiling when the drive mechanism rotates the spool to wind the support cables, optionally wherein the second ends of each of the plurality of support cables are symmetrically (or synchronously) movable (meaning that the support cables each ascend/descend at substantially the same rate/distance for each rotation of the spool) when the drive mechanism rotates such that the movable component remains level while descending/ascending.

In further embodiments, the moveable component is connected to the at least one support cable and is moveable between (i) a docked state in which the cable is retracted and the moveable component is engaged physically and electrically with the stationary component and (ii) an undocked state in which the cable is extended and the moveable component is physically and electrically disengaged from the stationary component, and wherein the moveable component supplies power to the electrical fixture only when in said docked state.

In some embodiments, the present disclosure provides for a multi-cable hoist mountable on a ceiling comprising:

a multi-channel spool comprising a plurality of channels;

a plurality of support cables, a first end of each of the plurality of support cables being associated with one of the plurality of channels; and a drive mechanism coupled to the multi-channel spool, wherein the drive mechanism is configured to rotate the spool to wind or unwind each of the plurality of support cables from their respective channels;

wherein the second ends of each of the plurality of support cables are symmetrically (or synchronously) movable (meaning that the support cables each ascend/descend at substantially the same rate/distance for each rotation of the spool) in a direction descending from the ceiling when the drive mechanism rotates the spool to unwind the support cables, and wherein the second ends of each of the plurality of support cables are symmetrically movable in a direction ascending toward the ceiling when the drive mechanism rotates the spool to wind the support cables.

In further embodiments, the multi-channel spool is mounted substantially level with the ground such that a plane of rotation thereof is substantially level with the ground.

In further embodiments, the device or hoist further comprises a guide (such as one or more pulleys) associated with each of the plurality of support cables to direct their respective cables in a direction substantially perpendicular to the ground.

In certain embodiments, the present invention provides an electrical fixture accessibility device comprising: a stationary component that attaches to [is capable of affixing to] an electrical junction box on a ceiling, wall, or other structure [supporting structure], the stationary component including at least one support cable that winds around a rotatable, motor-driven spool capable of extending and retracting the support cable, one or more power terminals electrically connected to a power supply, and one or more power connectors connected to the one of more power terminals; and a moveable component that attaches to the electrical fixture, the moveable component including one or more power contacts [pads] configured to both connect electrically with and disengage from the power connectors;

wherein the moveable component is connected to the at least one support cable and is moveable between (i) a docked state in which the cable is retracted [in the docked state the cable is typically fully retracted] and the moveable component is engaged physically and electrically with the stationary component and (ii) an undocked state in which the cable is extended [the cable can be partially or fully extended in some use instances] and the moveable component is physically and electrically disengaged from the stationary component, and wherein the moveable component supplies power to the electrical fixture only when in said docked state.

In another aspect, the present invention provides the accessibility device wherein the power connectors of the stationary component are elastically deformable [compressible].

In another aspect, the present invention provides the accessibility device wherein the contacts of the moveable component are contacts [pads] that make contact with [can touch] the connectors, which can be elastically deformable.

In another aspect, the present invention provides the accessibility device wherein the elastically deformable power connectors of the stationary component are springs that electrically connect with [make electrical contact with] the power connector pads of the moveable component when the moveable component and the stationary component are in the docked state.

In another aspect, the present invention provides the accessibility device further comprising one or more safety lock mechanisms that hold [secure] the moveable component and the stationary component when in the docked state.

In another aspect, the present invention provides the accessibility device, wherein the one or more safety lock mechanisms comprise one or more piston mechanisms on the stationary component and a corresponding number of mating receptacles [e.g., orifices or recesses] on the moveable component.

In another aspect, the present invention provides the accessibility device wherein the motor is a reversible motor [capable of operating or driving in both directions].

In another aspect, the present invention provides the accessibility device further comprising a belt wherein the belt mechanically couples the reversible motor and the one or more spools [wherein the belt drives and rotates the spools in the desired direction based upon the direction of torque provided by the reversible motor.]

In another aspect, the present invention provides the accessibility device wherein the power supply is located in the electrical junction box.

In another aspect, the present invention provides the accessibility device further comprising a control unit configured to instruct the motor-driven spool to unwind, wind, or halt the support cable.

In another aspect, the present invention provides the accessibility device further comprising a proximity sensor that signals the control logic when the moveable component is proximate to the stationary component.

In another aspect, the present invention provides the accessibility device further comprising a control unit configured to instruct the motor-driven spool to unwind, wind, or halt the support cable and to engage or disengage the piston from the receptacle.

In another aspect, the present invention provides the accessibility device further comprising a proximity sensor that signals the control logic when the moveable component is proximate to the stationary component.

In another aspect, the present invention provides the accessibility device wherein the electrical fixture is selected from one or more of the group consisting of a lighting fixture, a fan, a mobile, a speaker, a microphone, a monitor, a video monitor, a television, a surveillance camera, a safety device, a fire detector, a smoke detector, a carbon monoxide detector, an oxygen detector, a noxious gas detector, a heat detector, a cold detector, a gauge, a communication device, a temperature measuring device, and combinations of the foregoing.

In another aspect, the present invention provides the accessibility device wherein the electrical fixture is a lighting fixture.

In another aspect, the present invention provides the accessibility device wherein the electrical fixture is a fan.

In another aspect, the present invention provides the accessibility device wherein the electrical fixture is a combination lighting fixture and fan.

In another aspect, the present invention provides the accessibility device wherein the electrical power is AC power.

In another embodiment, the present invention provides an electrical fixture accessibility system comprising:

A. a stationary component that attaches to [is capable of affixing to] an electrical junction box on a ceiling, wall, or other structure [supporting structure], the stationary component including at least one support cable that winds around a rotatable, motor-driven spool capable of extending and retracting the support cable, one or more power terminals electrically connected to a power supply located in the electrical junction box, one or more power connectors connected to the one of more power terminals, and a control unit;

B. a moveable component that attaches to the electrical fixture, the moveable component including one or more power contacts [pads] configured to both connect electrically with and disengage from the power connectors, wherein the moveable component is connected to the at least one support cable and is moveable between (i) a docked state in which the cable is retracted [in the docked state the cable is typically fully retracted] and the moveable component is engaged physically and electrically with the stationary component and (ii) an undocked state in which the cable is extended [the cable can be partially or fully extended in some use instances] and the moveable component is physically and electrically disengaged from the stationary component, and wherein the moveable component supplies power to the electrical fixture only when in said docked state; and C. a remote control [user operable] to operate the motor-driven spool to lower or raise the moveable component between the docked state and the undocked state.

In another aspect, the present invention provides the accessibility system wherein the remote control is [user operable] and configured to transmit a fixture-identifying code to the control unit such that when said code matches the user-programmed fixture-identifying code, the motor-driven spool is rotated so as to either (i) descend the support cable and moveable component to facilitate user access of the electrical fixture or (ii) retract the support cable so as to raise the moveable component into the docked state with the stationary component and supply electrical power to the electrical fixture.

In yet another embodiment, the present invention provides a method of enabling access to an electrical fixture comprising using the aforementioned electrical fixture accessibility device to access an electrical fixture when the device is in the undocked state.

In another aspect, the present invention provides the method of enabling access to an electrical fixture comprising using the aforementioned electrical fixture accessibility system when the system is in the undocked state.

In an embodiment, the present invention provides for an electrical fixture accessibility device comprising:

A. a stationary component including:
   - two or more support cables;
   - one or more rotatable spools engaged with the two or more support cables;
   - a motor coupled with the one or more spools; and
   - a first power connector connected to a power supply, and B. a moveable component coupled with the two or more support cables, the moveable component including:

a second power connector releasably engageable with the first power connector;

wherein the moveable component is moveable between:

(i) a docked state where the moveable component is electrically engaged with the stationary component, by the first and second power connectors, to supply power to the moveable component, and (ii) an undocked state where the movable component is electrically disengaged from the stationary component.

In further embodiments, the stationary component is configured to attach to an electrical junction box on a ceiling, wall, or other structure.

In further embodiments, the electrical fixture accessibility device further comprises one or more safety lock mechanisms that hold the moveable component and the stationary component when in the docked state.

In further embodiments, the one or more safety lock mechanisms comprise one or more piston mechanisms on one of the stationary component or the moveable component and a corresponding number of mating receptacles on the other of the stationary component or the moveable component.

In further embodiments, the motor is a reversible motor.

In further embodiments, the device further comprises a belt wherein the belt mechanically couples the motor and the one or more spools.

In further embodiments, the motor drives the one or more spools to unwind or wind the two or more support cables, thereby descending or raising the moveable component.

In further embodiments, the device further comprises a control unit configured to instruct the motor to unwind, wind, or halt the two or more support cables.

In further embodiments, the device further comprises a proximity sensor that signals the control unit when the moveable component is proximate to the stationary component.

In further embodiments, the device further comprises a control unit configured to instruct the motor-driven spool to unwind, wind, or halt the support cables and to engage or disengage the one or more piston mechanisms from their respective receptacles.

In further embodiments, the moveable component, in the docked state, supplies power to an attached electrical fixture.

In further embodiments, the device further comprises a remote control to operate the motor unwind or wind the one or more spools to descend or raise the movable component.

In further embodiments, the remote control is configured to transmit a fixture-identifying code to the control unit such that when said code matches the user-programmed fixture-identifying code, the one or more spools are rotated so as to either (i) descend the two or more support cables and moveable component or (ii) retract the two or more support cables so as to raise the moveable component into the docked state with the stationary component and supply electrical power to the electrical fixture.

In further embodiments, the present invention provides for a method of enabling access to an electrical fixture comprising using an electrical fixture accessibility device to access an electrical fixture attached to the movable component of the device when the device is in the undocked state.

In further embodiments, an axis of rotation of the one or more rotatable spools is substantially perpendicular to a surface on which the stationary component is mounted.

In further embodiments, the present invention provides for an electrical fixture accessibility device comprising:

a. a stationary component comprising:

(i) a multi-channel spool comprising a plurality of channels;

(ii) a plurality of support cables, a first end of each of the plurality of support cables being associated with a respective one of the plurality of channels of the multi-channel spool;

(iii) a drive mechanism coupled to the multi-channel spool, wherein the drive mechanism is configured to rotate the spool to unwind or wind each of the plurality of support cables from their respective channels; and (iv) a first electrical connector, and b. a movable component comprising:

(i) a connection to a second end of each of the plurality of support cables; and (ii) a second electrical connector releasably engageable with the first electrical connector.

In further embodiments, the stationary component is configured to attach to an electrical junction box on a ceiling.

In further embodiments, the movable component is movable in a direction descending from the ceiling when the drive mechanism rotates the spool to unwind the support cables, and wherein the movable component is movable in a direction ascending toward the ceiling when the drive mechanism rotates the spool to wind the support cables, In further embodiments, the second ends of each of the plurality of support cables are synchronously movable when the drive mechanism rotates such that the movable component remains substantially parallel with a surface upon which the stationary component is mounted while descending or ascending.

In further embodiments, the moveable component is moveable between (i) a docked state in which moveable component is electrically engaged with the stationary component and (ii) an undocked state in which the moveable component is electrically disengaged from the stationary component.

In further embodiments, the movable component comprises a junction configured for physical and electrical attachment to an electrical fixture, wherein the attached electrical fixture is electrically coupled with the second electrical connector to provide power to the electrical fixture in the docked state.

In further embodiments, an axis of rotation of the multi-channel spool is substantially perpendicular to a surface on which the stationary component is mounted.

In further embodiments, the present invention provides for a multi-cable hoist mountable on a ceiling comprising:

(i) a multi-channel spool comprising a plurality of channels;

(ii) a plurality of support cables, a first end of each of the plurality of support cables being associated with a respective one of the plurality of channels; and (iii) a drive mechanism coupled to the multi-channel spool, wherein the drive mechanism is configured to rotate the spool to unwind or wind each of the plurality of support cables from their respective channels to descend or raise a second end of each of the plurality of support cables.

In further embodiments, the second end of each of the plurality of support cables are synchronously movable in a direction descending from the ceiling when the drive mechanism rotates the spool to unwind the support cables, and wherein the second end of each of the plurality of support cables are synchronously movable in a direction ascending toward the ceiling when the drive mechanism rotates the spool to wind the support cables.

In further embodiments, an axis of rotation of the multi-channel spool is substantially perpendicular to a surface on which the stationary component is mounted.

In further embodiments, the hoist further comprises a guide associated with each of the plurality of support cables to direct their respective cables in a direction substantially perpendicular to the ground.

In further embodiments, the hoist further comprises a movable component coupled with one or more ends of the cables, the movable component being docked to a hoist body housing the hoist, when the second ends of the support cables are fully raised.

In further embodiments, the hoist body and movable components comprise complementary and releasably engageable electrical connectors which supply power, in an engaged state, to the movable component when the movable component is docked to the hoist body.

In further embodiments, the hoist further comprises a respective support cable guide for each of the respective channels of the plurality of channels, wherein the support cable guides align the respective support cable to wind into their respective channel.

In further embodiments, the hoist further comprises a respective directional guide adjacent each support cable guide, wherein the directional guides direct the respective support cable toward the ground.

In further embodiments, the present disclosure provides for systems comprising:

I. an electrical fixture accessibility device comprising:

A. a stationary component including:

two or more support cables;

one or more rotatable spools engaged with the two or more support cables;

a motor coupled with the one or more spools; and a first power connector connected to a power supply, and B. a moveable component coupled with the two or more support cables, the moveable component including:

a second power connector releasably engageable with the first power connector;

wherein the moveable component is moveable between:

(i) a docked state where the moveable component is electrically engaged with the stationary component, by the first and second power connectors, to supply power to the moveable component, and (ii) an undocked state where the movable component is electrically disengaged from the stationary component; and II. an electrical fixture attached the movable component, wherein the attached electrical fixture is electrically coupled with the second electrical connector to provide power from the power supply to the electrical fixture in the docked state.

In various embodiments, the system includes a removable or universal electrical fixture, such as a standard ceiling fan or lighting fixture. In various alternative embodiments, the system includes an electrical fixture built into or otherwise attached to the movable component.

These and other aspects of the present invention will become apparent from the disclosure herein.

BRIEF DESCRIPTION OF THE DRAWINGS

Aspects and advantages of the present disclosure will become apparent from the following exemplary embodiments taken in conjunction with the accompanying drawings, of which.

DETAILED DESCRIPTION

Figure 1:
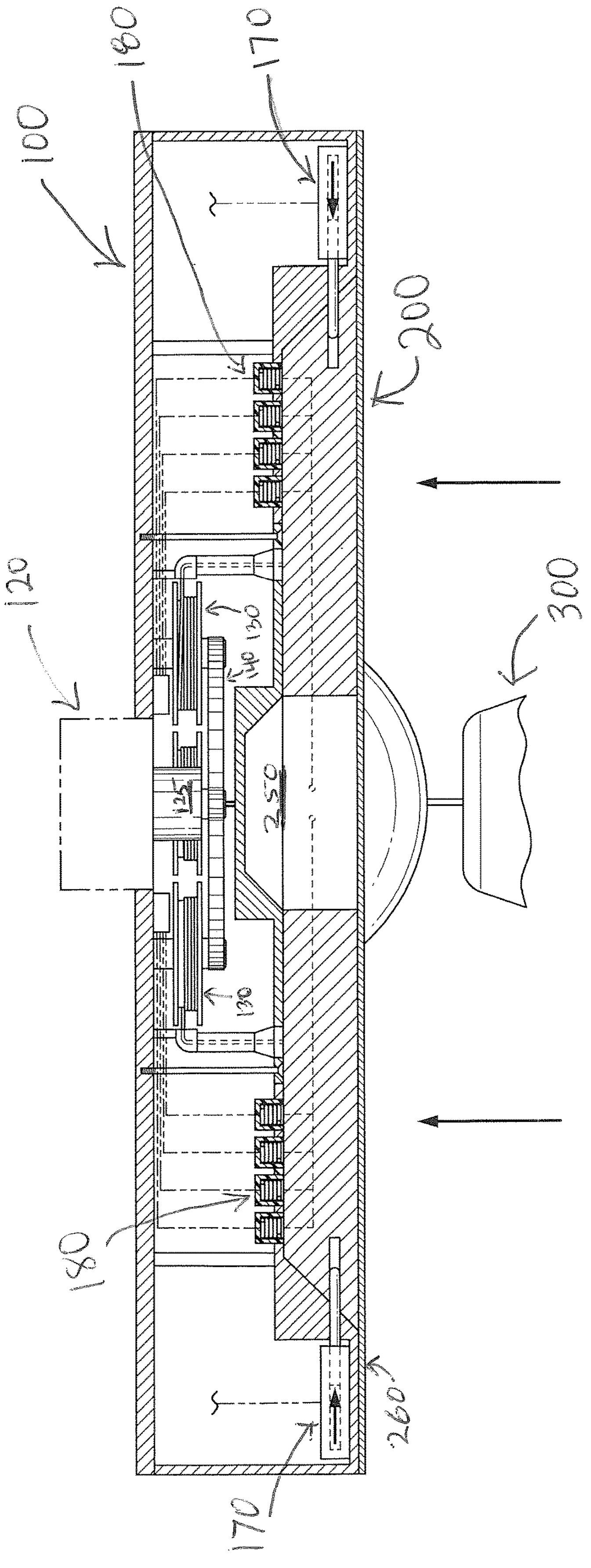
FIG. 1 is a cross-sectional view of an embodiment of the ceiling fixture accessibility device disclosed herein in a docked state with the stationary component and the moveable component engaged both physically and electrically.

The present invention provides for both directly wired and remote-controlled, retractable accessibility devices for ceiling and wall electrical fixtures and those attached to other structural surfaces, such as for lighting fixtures, fans, ceiling fans, mobiles, speakers, microphones, monitors, video monitors, televisions, surveillance cameras, safety devices, fire detectors, smoke detectors, carbon monoxide detectors, oxygen detectors, noxious gas detectors, heat detectors, cold detectors, gauges, communication devices, and temperature measuring devices. Also, the invention provides for accessing combinations of fixtures, such as a combination light and fan fixture.

It is contemplated that the accessibility devices of the present invention would be modified accordingly to accommodate different mounting and connection requirements or characteristics which can vary depending upon the electrical fixture one would want to be able to access with the installation and use of this device. For example, a lighting fixture could have different requirements or characteristics, versus a ceiling fan, versus a speaker, etc.

The devices generally may allow for the raising and lowering of a fixture via wireless or hardwired control. The devices may comprise one or more modules that enable wireless communication and/or winch control. Examples of the control can include a Wi-Fi/Bluetooth enabled mobile app (application) or a handheld radio control. The core of the device comprises a winch, pulley, or hoist system concealed in a housing which, via one or more cables that wind or unwind around one or more motorized pulleys, spools, reels, or the like, lowers and raises the fixture. In some embodiments, the device also may comprise a stabilizing system to maintain the fixture essentially level and to prevent rotation and twisting of the fixture as it is lowered and raised.

In some embodiments, the device is designed with mating electrical connections that automatically disengage and reengage to cut off the flow of electricity when the fixture is lowered and raised. This automatic cut-off of electricity to the fixture is an important safety feature so that the fixture can be safely accessed without a shock hazard. One embodiment of these connectors is an electrical connector, such as a deformable electrical connector, such as a spring or spring-loaded connector, provided on one surface and a corresponding contact or pad provided on an opposing surface. As is explained below, a deformable electrical connector and corresponding contact or pad are advantageous because they will be able to engage and form an electrical connection over a wide range of orientations. Another embodiment of connectors are complementary first and second connectors (such as male and female connectors) which are releasably engageable.

The device can be constructed in various forms. For example, the device can be an aftermarket device that can be connected to an existing ceiling- or angled wall-mounted electrical junction box of standard size and shape to convert a stationary electrical fixture (e.g., a light, fixture, ceiling fan, etc.) into a moveable and accessible fixture. In alternative embodiments the device can be designed as an original construction device, with an incorporated electrical junction box for installing an electrical fixture so that it is moveable and accessible, or as an OEM [original equipment manufacturer] device.

The aftermarket version of the device will allow for the device to be attached to and incorporated into an originally installed junction box in the ceiling or wall, etc. The device can comprise a decorative cover or veneer for aesthetic purposes. The fixture would then attach to the device. The junction box may at least be compliant with National Electric Code 314.27 regarding supportable weight.

Alternatively, the version of the device designed for original construction is designed such that the device itself is integrated into a junction box and comprises the overall device. This overall device that is integrated into a junction box is readily installed to supporting features such as ceiling joists, studs, posts, or other appropriate structural features. In this case, there is no need for a traditional junction box as the device incorporates both the junction box to which the building electrical supply will be attached as well as the device itself to which the fixture will be attached.

Alternatively, the version of the device for OEM applications includes lights, fixtures, fans, etc. that have the appropriate electrical connectors and cable/winch attachments to electrically and releasably engage with the stationary base component directly.

Alternatively, the device may be constructed with more than one junction box and may combine, for example, an original construction junction box for connection to a fixture with an aftermarket ceiling junction box that is supplied with electric power and has been affixed to support joists or the like.

Definitions

As used herein, the following terms and abbreviations have the indicated meanings unless expressly stated to the contrary.

The term "standard" as used herein in reference to an electrical junction box means a ceiling junction box of substantially rectangular or circular shape and size as is commonly used in the construction industry.

The term "descendable" (alternatively spelled "descendible") as used herein means that the device provides for lowering or descending of the fixture.

The term "ergonomic" is used herein is intended to have its common meaning indicating relating to or designed for efficiency and comfort in the user environment.

The terms "multi-positionable" and "multi-positional" as used herein mean that the device can be oriented and used so that the fixture can be located in different positions by a user as desired.

The term "fixture", or alternatively "electrical fixture" is used herein to include a wide range of electrical products such as lighting fixtures, fans, ceiling fans, mobiles, speakers, microphones, monitors, video monitors, televisions, surveillance cameras, safety devices such as fire detectors, smoke detectors, carbon monoxide detectors, oxygen detectors, noxious gas detectors, heat detectors, and cold detectors, etcetera, gauges, communication equipment, and temperature measuring devices. The term "fixture" is intended to include any kind of electrical device that can be mounted on a ceiling, wall, post, overhang, rafter, eave, or other structural location that is not completely vertical where more ready and convenient access of the fixture is desired.

The term "retractable" as used herein means that the device provides for raising or retracting the fixture back to its docked position on a ceiling, wall, or other structural feature.

The term "wall" as used herein is used in its standard terminology to describe the side of a room, building or structure and means an upright structure that encloses, divides, or protects an area.

The term "ceiling" as used herein is used in its standard terminology. That is to say, the term "ceiling" as used herein refers to the upper surface of a room, compartment, or overhead structure. Ceilings include flat ceilings (essentially horizontal and parallel to a floor) as well as angled, vaulted or cathedral ceilings.

As used herein, "infinitely adjustable" means that a component is continuously adjustable across a smooth continuum of positions across the entire mechanical limit of the adjustment. In some embodiments, one or more pre-marked adjustments may be present and a component may be infinitely or continuously adjustable both in-between the one or more pre-marked adjustments and in-between the entire mechanical limit of the adjustment.

Ceiling, Wall, and Other Structural Fixture Accessibility Device

The present invention provides an ergonomic, descendable and retractable device for providing access to a fixture for maintenance, servicing, cleaning, and other purposes. Although the terms ceiling and wall are used herein with respect to the fixture, the present invention contemplates that the fixture can be located on a wide range of structural features including posts, beams, overhangs, rafters, eaves, trusses, scaffolding, catwalks, walkways, etc. In other words, the device can be used for providing safe and convenient access to fixtures that are not readily accessible to or are out of arm's reach to a user when the user is located on a ground surface or is otherwise located such that ready access to the fixture is not available.

Many available devices are limited in the range of adjustments and positions that can be achieved. Also, many devices do not have the safety feature of automatically disconnecting the electrical circuit to the device when it is lowered. Furthermore, many devices do not provide a stabilizing, leveling, or anti-twisting means to prevent the fixture from unwanted tipping or rotation as it is extended from and retracted from the ceiling, wall, or other structure.

To address these limitations, the present invention provides a descendable and retractable device for lowering and raising a fixture from a ceiling wall or other inaccessible supporting structure.

Cables (Support Cables)

Cables, capable of supporting the weight of the descendable/ascendable moveable component and any attached fixture are attached on one end to a spool. In some embodiments, a belt connected to a reversible motor drives the belt to rotate the spools. In alternative embodiments, a motor drives a spool directly or by a gear. The support cable winds or unwinds about the spool or spools according to the direction of rotation. In some embodiments, the other end of the cable (the end not attached to a spool) passes through an elbow shaped guide and is attached to a moveable component below. Winding or unwinding the cables about the spool(s) will cause the fixture and the moveable component to be rise or descend. The cables may be constructed of any suitable material that provides sufficient strength for supporting and lifting the moveable component and fixture, and sufficient size and flexibility for winding and unwinding around spools. The support cables may be braided metal cables, metal cables, polymer-coated cables, polymeric cables, braided polymeric cables, or any other suitable cable. Advantageously, electrical fixture accessibility devices and/or hoists may utilize two or more support cables. In some embodiments, electrical fixture accessibility devices and/or hoists may include two support cables. In some embodiments, electrical fixture accessibility devices and/or hoists may include three support cables.

Drive Mechanism

Some embodiments may comprise one or more motorized spools of cable attached to the moveable component to lower and raise the moveable component and thereby lower and raise an electrical fixture, if attached. The one or more motorized spools of cable may be alternatively denoted as hoists, winches, winch systems, motorized reels, and the like. Various motor designs can be employed to unwind and wind the spools of wire/cable to control the movement of the moveable or descendable portion. Some embodiments employing continuous or semi-continuous concentric electrodes may comprise a single spool. Some embodiments may comprise a single spool with multiple channels for respective multiple support cables. Some embodiments may comprise a single spool with two or more channels for two or more support cables. Some of the embodiments below are described as having three spools and cables because of the good stability (anti-tipping and anti-torquing) performance such a configuration provides. It can be appreciated that a single spool having multiple channels also achieves said stability by spacing downwardly-guided support cables circumferentially around the spool. Needless to say, other embodiments having a fewer or greater number of spools and cables are contemplated.

The one or more motorized spools or winches may be powered directly by the power source [e.g., AC power] and may be controlled by one or more spool control modules. The one or more spool control modules may be controlled by one or more wireless or wired communication modules. In some embodiments, the wireless communication and spool control aspects may be performed by a single module. In some embodiments, wireless communication and/or spool control modules may comprise a DC converter or may be supplied with DC power from a DC converter. In some embodiments, the motorized spools or winches are supplied with DC power from an incorporated or external converter. In some embodiments the motorized spools or winches may be driven by belt connected to a motor. It can be appreciated that any means to power the spools and to control the spools wirelessly or by hardwired control are contemplated. The motorized spools or winches may comprise one or more locking or braking mechanisms so that the moveable component is held in place when fully retracted. In some embodiments, the one or more locking mechanisms may be disengaged to allow the moveable component to be lowered. In some embodiments, the locking mechanisms may comprise one or more actuation components that are electrically controlled by the wireless communication and/or spool control modules. It can be appreciated that any of the control, communication, or power features can be incorporated into any number of modules or can be incorporated directly into the motorized spools or winches. In some embodiments, the motorized spools or winches and optional locking or braking mechanisms thereof are the primary means to keep the moveable component retracted. In some embodiments, an additional or further safety feature is used to maintain the moveable component in a retracted position.

In some embodiments, 2, 3, 4, 5, 6, or more spools may be included. In some embodiments, one or more of the winches may have a higher load capacity than the others. In some embodiments, 2 spools are included. In some embodiments, 3 spools may be included. In some embodiments, 4 spools are included. In some embodiments, a single spool having two or more channels is included. In some embodiments, the spools are arranged symmetrically around the dimensions of the moveable component that they are attached to. In some embodiments, the spools may be non-symmetrically arranged around the dimensions of the moveable component. In some embodiments, the spools are fixed in place. In some embodiments, the spools are attached to tracks or brackets that allow for the spool positions to be adjusted based upon the application. In some embodiments, the positions of the spools (or guides for single multi-channel spool embodiments) may be fully configurable with respect to the dimensions of the moveable component. In some embodiments, the device may be modifiable so that one or more spools can be added to support heavier fixtures. In some embodiments, the spools are modular and the number of spools can be changed in a given device that is pre-wired and configured to control and power the spools. It can be appreciated that the number of spools may be changed based upon the particular application and upon the size and weight of the fixture that the device is designed to support.

Electrical Safety Feature

Figure 2:
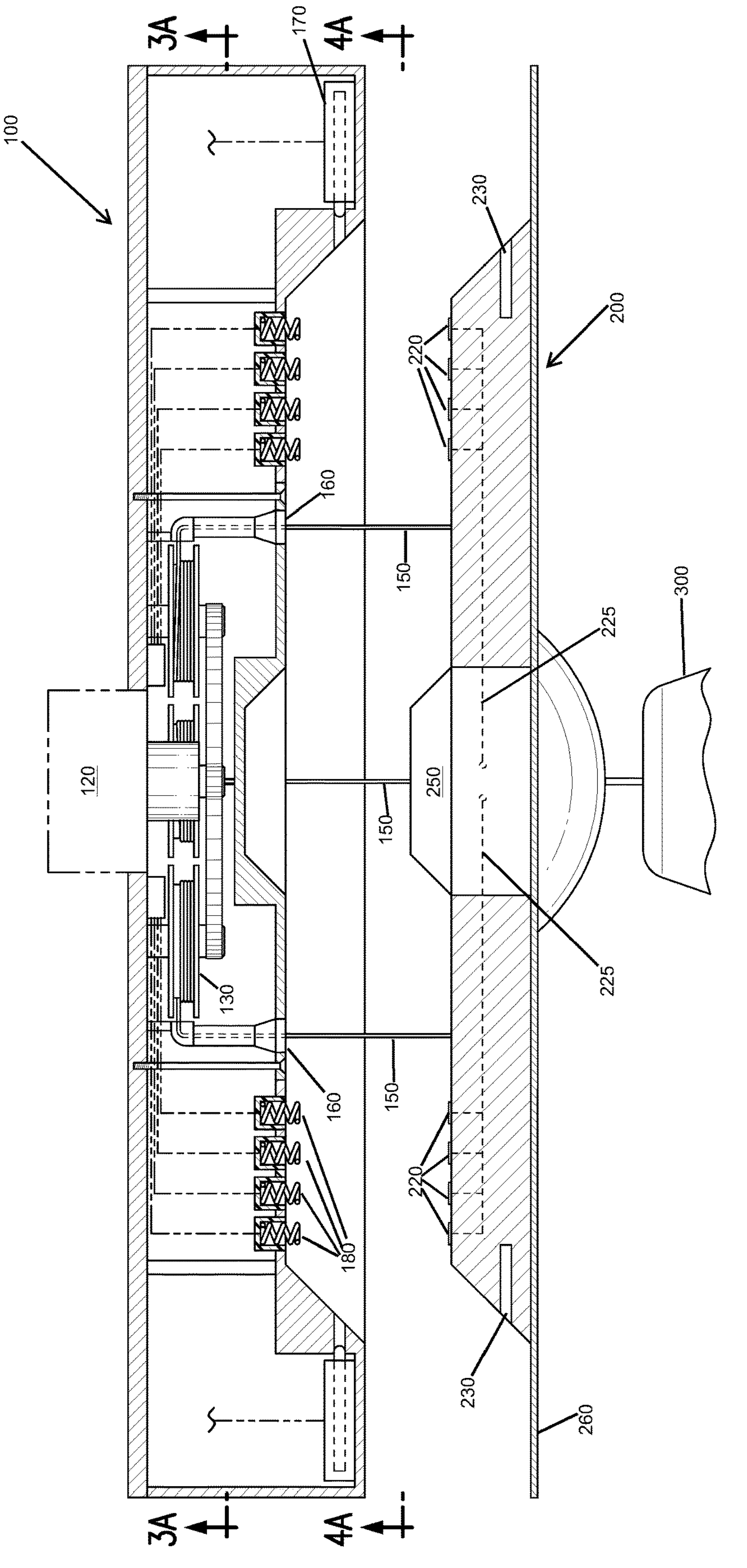
FIG. 2 is a cross-sectional view of an embodiment of the ceiling fixture accessibility device disclosed herein in an undocked state with the stationary component and the moveable component disconnected or disengaged both physically and electrically.

The device is designed with electrical connectors that automatically disengage and reengage to cut off the flow of electricity when the moveable component and/or fixture is lowered and raised. This automatic cut off of electricity to the fixture is an important safety feature so that the fixture can be safely accessed. FIGS. 1 and 2 show an embodiment of the device having a moveable component and electrical connectors [deformable connectors such as springs] and contacts [pads] that automatically disengage when the moveable component is lowered. This safety feature may also be accomplished by other electrical connectors, such as the releasably engageable electrical connectors shown in FIGS. 36A, 36B, and 37. When the movable component is descended (undocked) from the stationary component, the complementary electrical connectors may disengage thereby cutting off power to the movable component.

Power Source and Control

Power may be supplied to the fixture via power lines in the ceiling that are connected to a ceiling junction box. As is described below in reference to FIG. 9, terminal strips are provided on the stationary component for supplying local power to the device and the connected fixture. Each device is provided with a user configurable DIP switch to set a unique device identifying code.

The device may be operated (raised or lowered) by remote control, either via a wireless remote control or a hardwired switch such as a wall switch. Embodiments of these forms of remote control are shown in FIGS. 10A-12B. One or more DIP switches provided on the remote control allow the user to pair a remote control with a particular device and its associated fixture. A single remote control may control the operation of up to eight devices.

It is contemplated that while a wall switch itself is normally hardwired, the toggle on the bottom of it will usually be powered by wires from the wall, but will still be transmitting to the control unit via wireless technology. This feature prevents the need for having a circuit to be run from the switch to the unit for purposes of controlling the raising and lowering the unit. In an aftermarket embodiment, it could be difficult or impractical to run wires from a ceiling junction box to the switch given walls and framing barriers that might exist, thus the need for the toggle to operate the control wirelessly.

Aftermarket Embodiments

The aftermarket version will allow for the device to be attached to the originally installed junction box in the ceiling or wall, utilizing a decorative veneer for aesthetic purposes. The fixture would then attach to the device.

Alternative Original Construction Embodiments

An alternative version designed for original construction will have the device integrated into the junction box itself to house the unit, which will then be installed in the ceiling joists. There will be no need for a traditional junction box as the unit will be both the junction box to which the building electrical supply will be attached as well as the device itself to which the fixture will be attached.

Alternative OEM Embodiments

Figure 20A:
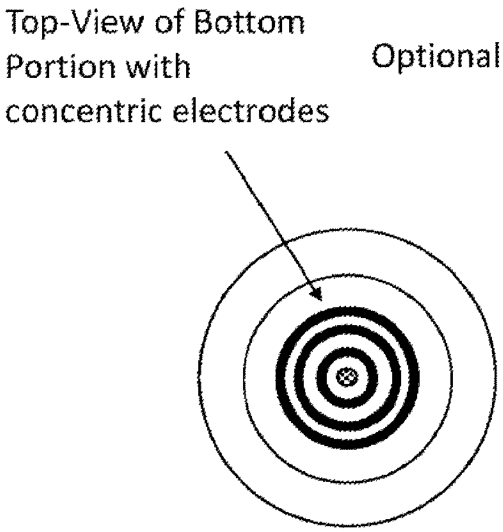
FIG. 20A shows a top view and FIGS. 20B and 20C show cross-sectional views of an embodiment with a moveable component comprising a recessed light. The embodiment utilizes concentric circular electrodes such that the moveable component can be retracted in any rotational position. The concentric electrodes may be spring-loaded as shown in the embodiment.
Figure 20B:
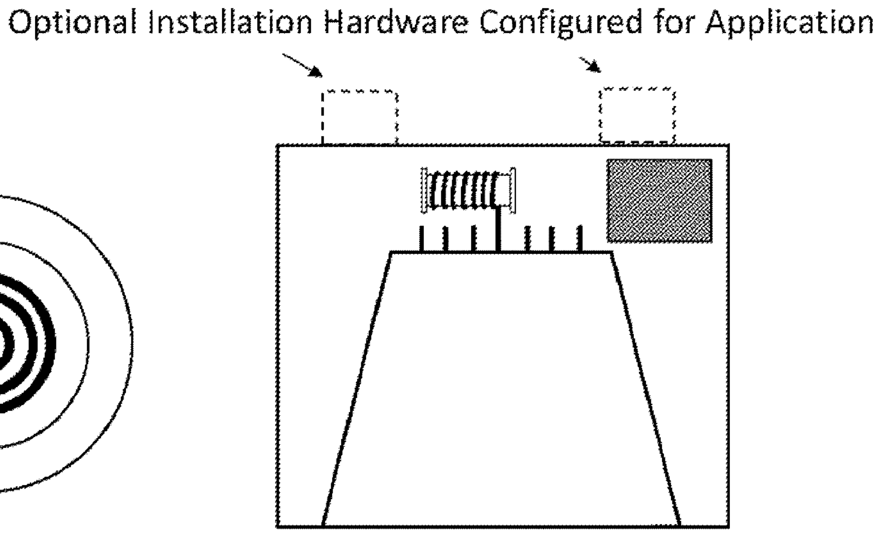
Figure 20C:
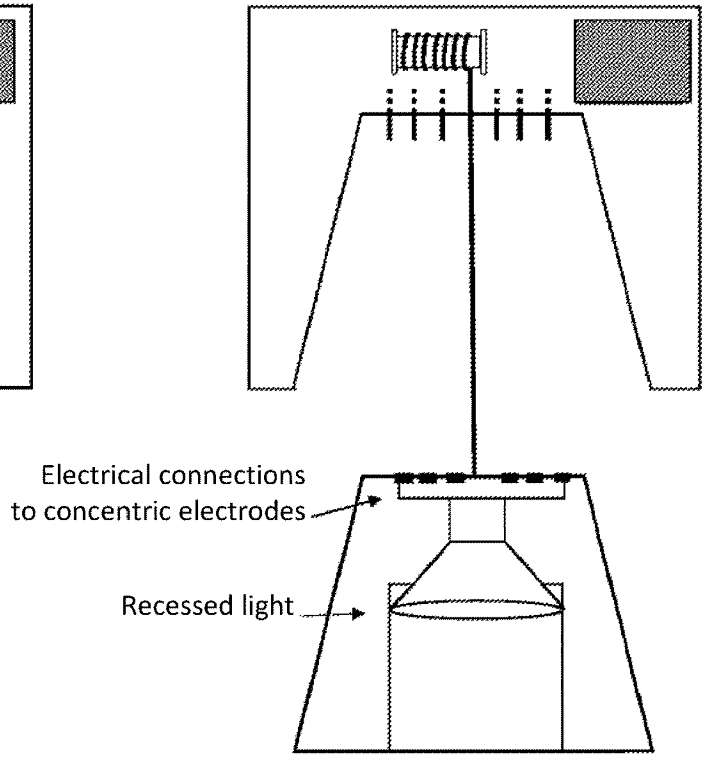
Figure 21:
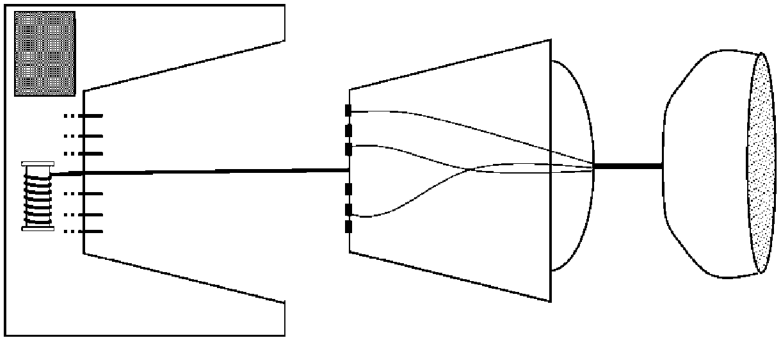
FIG. 21 shows a cross-sectional view of a different version of the embodiment shown in FIG. 20 having an electrical device such as a light fixture attached to the bottom of the moveable component.
Figure 22:
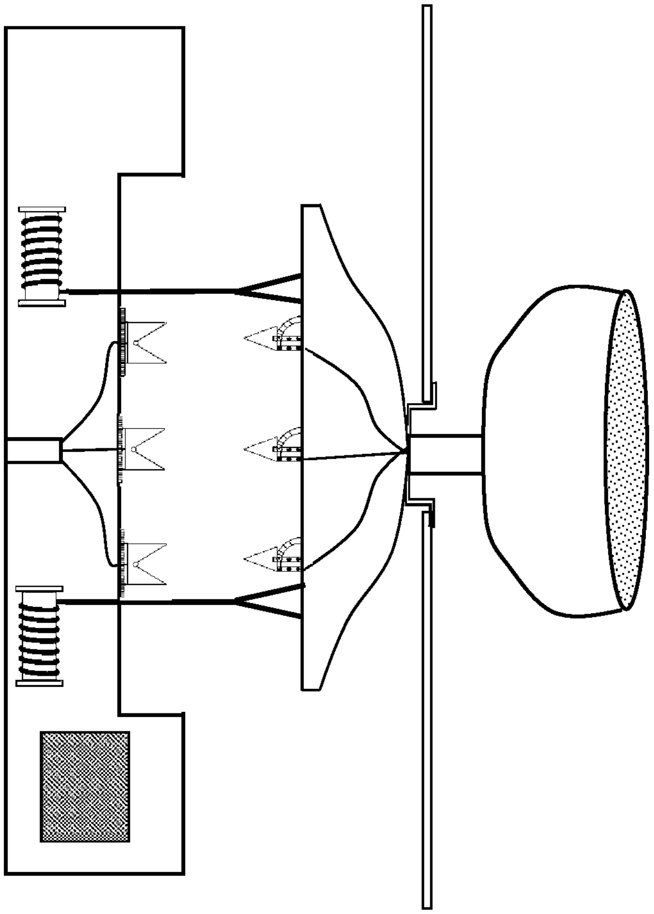
FIG. 22 shows an OEM (original equipment manufacturer) embodiment excluding a moveable component and having the electrical connectors and cables attached directly to an electrical device such as a fan or other fixture.
Figure 23:
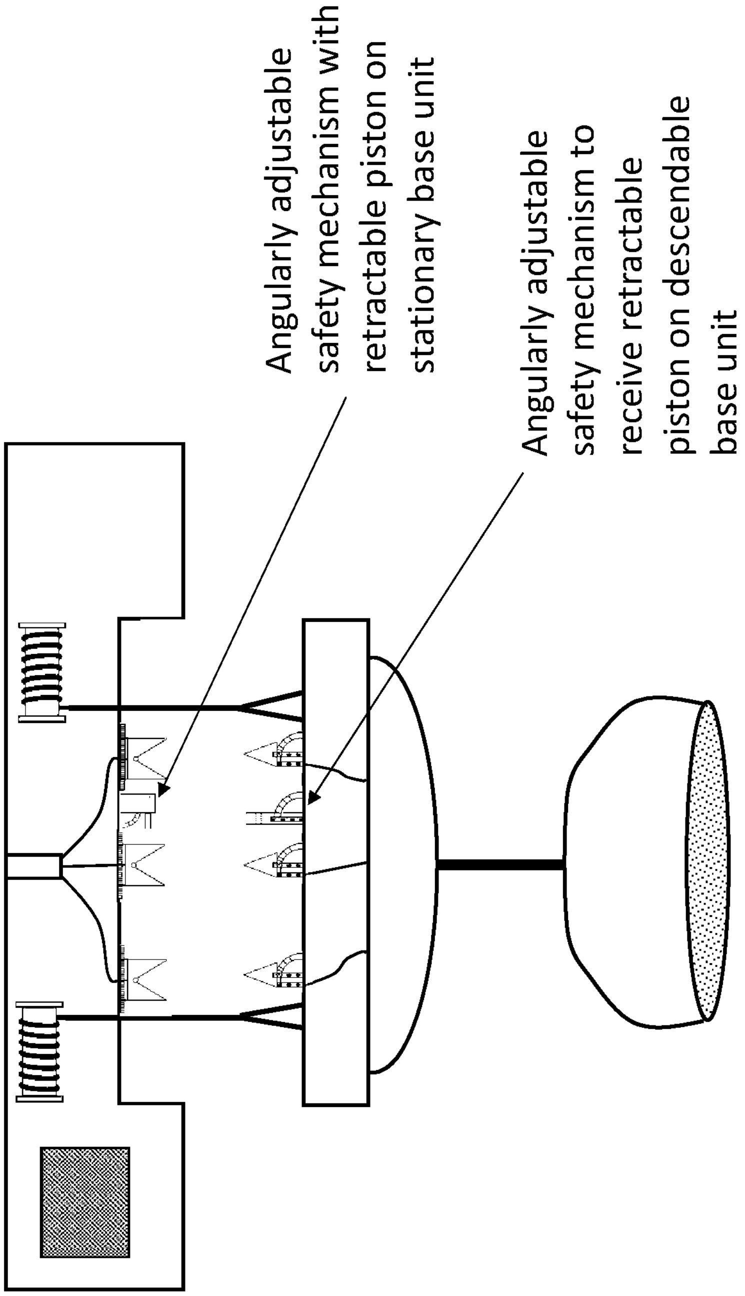
FIG. 23 shows a cross-section of the device of FIG. 18 further including the piston-activated safety mechanism shown in FIG. 19.

OEM embodiments may exclude a retractable base component and instead comprise a fixture having electrical connectors, including any slidable or angular adjustment mechanisms, and cable attachments. An example embodiment is shown in FIG. 22 with a fan having the male connectors of FIG. 17 that can engage with the female connectors on the stationary base component when the fixture is retracted. A further embodiment is shown in FIG. 20 which has a single winch and uses concentric electrodes so that the recessed light fixture can electrically engage with the stationary base component at any rotational position. It can be appreciated that such embodiments are exemplary and any OEM application or embodiment relying upon any combinations of the features of the present disclosure are within the scope of the present disclosure.

Description of Components

The following description is related to particular embodiments and provides a non-limiting overview of the various components of devices within the scope of the disclosure.

For aftermarket embodiments, reference is made to the drawings. FIG. 1 shows a stationary component 100 of the fixture accessibility device affixed to a ceiling junction box 120 by screws or other affixing means (not shown). The stationary component 100 includes a reversible motor 125 that drives a belt 140 that drives spools 130 to wind or unwind a respective suspension cable. The embodiment of FIG. 1 shows three spools 130, but other numbers of spools and suspension cables is contemplated. Here, the suspension cables are shown as fully retracted, each cable being wound on its respective spool 130 so as to raise a moveable component 200 of the fixture accessibility device into a docked state in which the moveable component 200 is physically and electrically connected to the stationary component 100. The moveable component 200 also includes an auxiliary junction box 250 to which the fixture 300, shown as an overhead light in this drawing, is connected physically and electrically.

In the docked state, deformable power connectors 180, shown in this embodiment as four connectors arrayed on both the left and right sides of the stationary component 100, compress against and make electrical contact with respective mating pads disposed on the moveable component 200. A locking mechanism 170, shown in this embodiment as a piston disposed on the left and right sides of the stationary component 100, engage with corresponding recesses on the moveable component to securely hold the moveable component in place and maintain the docked state. An optional decorative face plate 260 on the bottom face of the moveable component 200 conceals the stationary component 100 when is the docked state.

FIG. 2 shows the stationary component 100 and the moveable component 200 in an undocked state. In this state, the moveable component 200 suspended below the stationary component 100 by suspension cables 150 that descend from spools 130 and pass though flanged elbows 160. Locking mechanisms 170 have been retracted from corresponding recesses 230 so as to allow the moveable component 200 to descend. As can be seen, the deformable power connectors 180 on the stationary component 100 are disconnected from respective mating pads 220. The pads 220 are further connected to power lines 225 for supplying power to the fixture 300 at the auxiliary junction box 150.

Figure 3A:
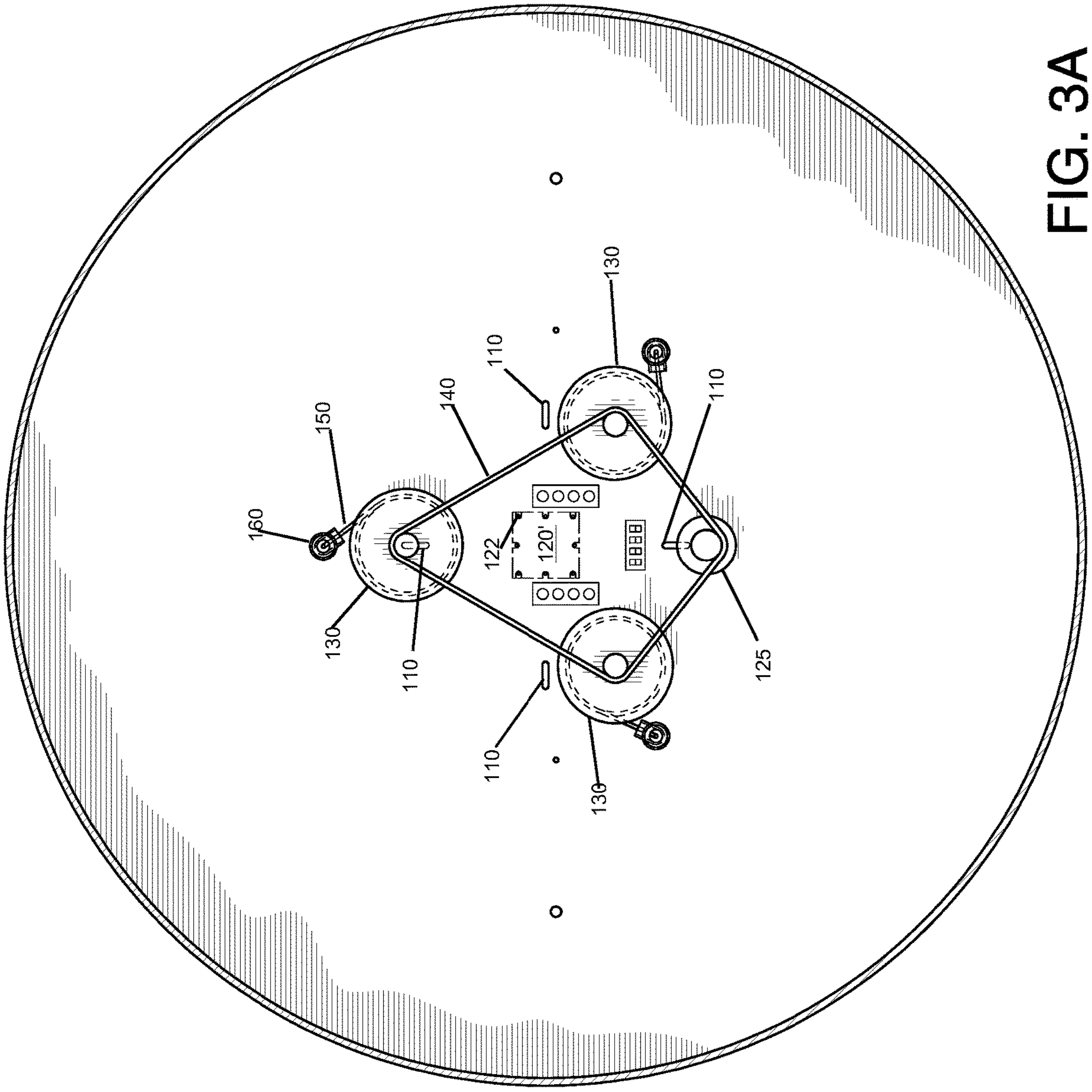
FIG. 3A is a cross-sectional view of the embodiment along direction 3A as shown in FIG. 1.
Figure 3B:
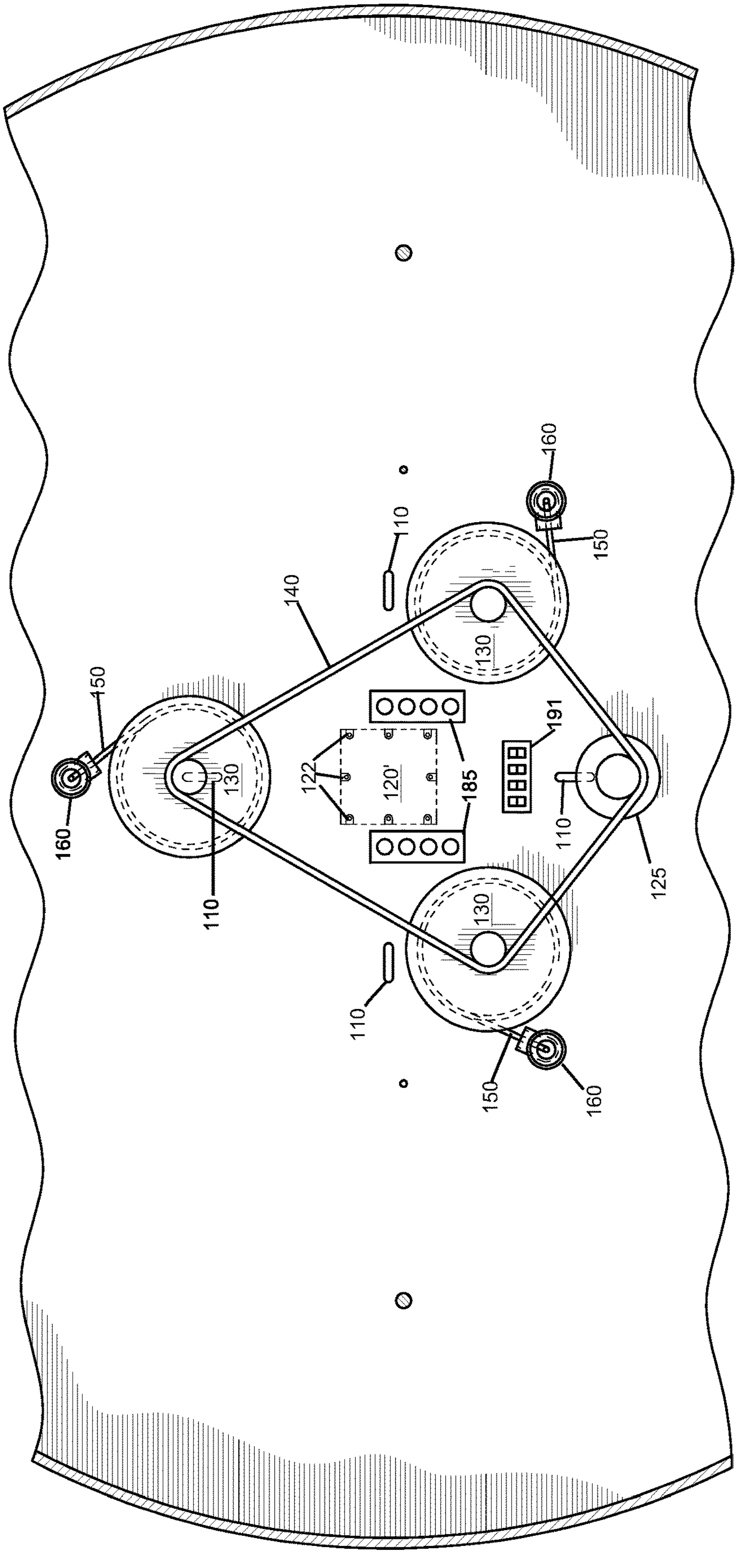
FIG. 3B is an enlarged partial view of FIG. 3A.

FIGS. 3A and 3B are cross-sectional views of the stationary component 100 along direction 3A as shown in FIG. 2. FIGS. 3A and 3B show the positioning of the three spools 130 and their associated guiding elbow 160 and suspension cable 150, the belt 140, and reversible motor 125 in relation to an opening 120' for the ceiling junction box 120. In this embodiment, three suspension cables 150 and a corresponding number of spools 130 and elbows 160 are used to provide adequate strength and stability to support the moveable component 200 and the fixture 300. The belt 140 defines a perimeter of a user access area that, as will be explained below and in reference to FIG. 5, facilitates the physical mounting of the device to the ceiling junction box 120, attachment of AC power lines to power strips 185, and the setting of a fixture-identifying code via a 4-position DIP switch 189.

Screw mounting tabs 122 are provided around the edges of the opening 120'. Mounting screws (shown in FIG. 7) can be threaded through these tabs 122 to physically secure the stationary component 100 to the ceiling junction box 120. For additional mounting strength, holes or slots 110 are provided outside the junction box opening 120' to more securely fasten the stationary component 100 to the ceiling or wall when extra support is needed for heavier electrical fixtures. A toggle bolt or other secure fastening system may be used to fasten the stationary component 100 through slots 110 to the ceiling or joists. On left and right sides of the opening 120' are disposed terminal strips 185 to which a user can connect AC power lines that have been fed from the junction box 120 and through the opening 120'. This embodiment shows two terminal strips 185 to accommodate two AC power lines for use with fixture 300 that combines, for example, a ceiling light and a ceiling fan, each with its own supply of power. Other embodiments having a fewer or greater number of terminal strips 185 are also contemplated in accordance with the requirements of a particular application.

A control unit 191 that includes the user settable 4-position DIP switch 189 is shown within the user access area bounded by the belt 140. The DIP switch 189 is set by the user to establish a fixture-identifying code that, when transmitted by a wireless remote control or wired switch, will allow remote controlled operation of the accessibility device.

Figure 4A:
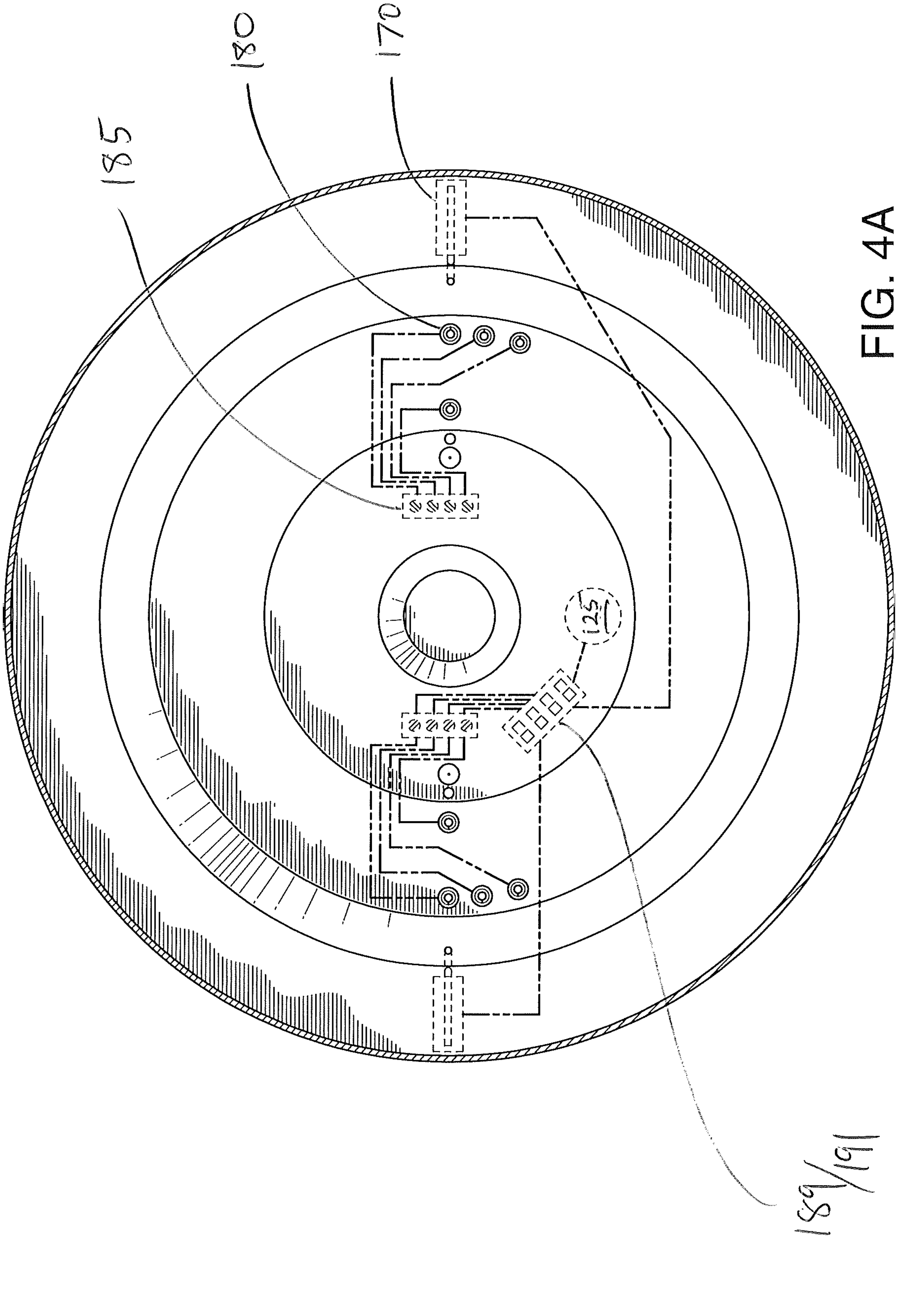
FIG. 4A is a cross-sectional view of the embodiment of the stationary component along direction 4A as shown in FIG. 2. Note that the depth of the various levels of the stationary component are illustrated with radially drawn shading lines.
Figure 4B:
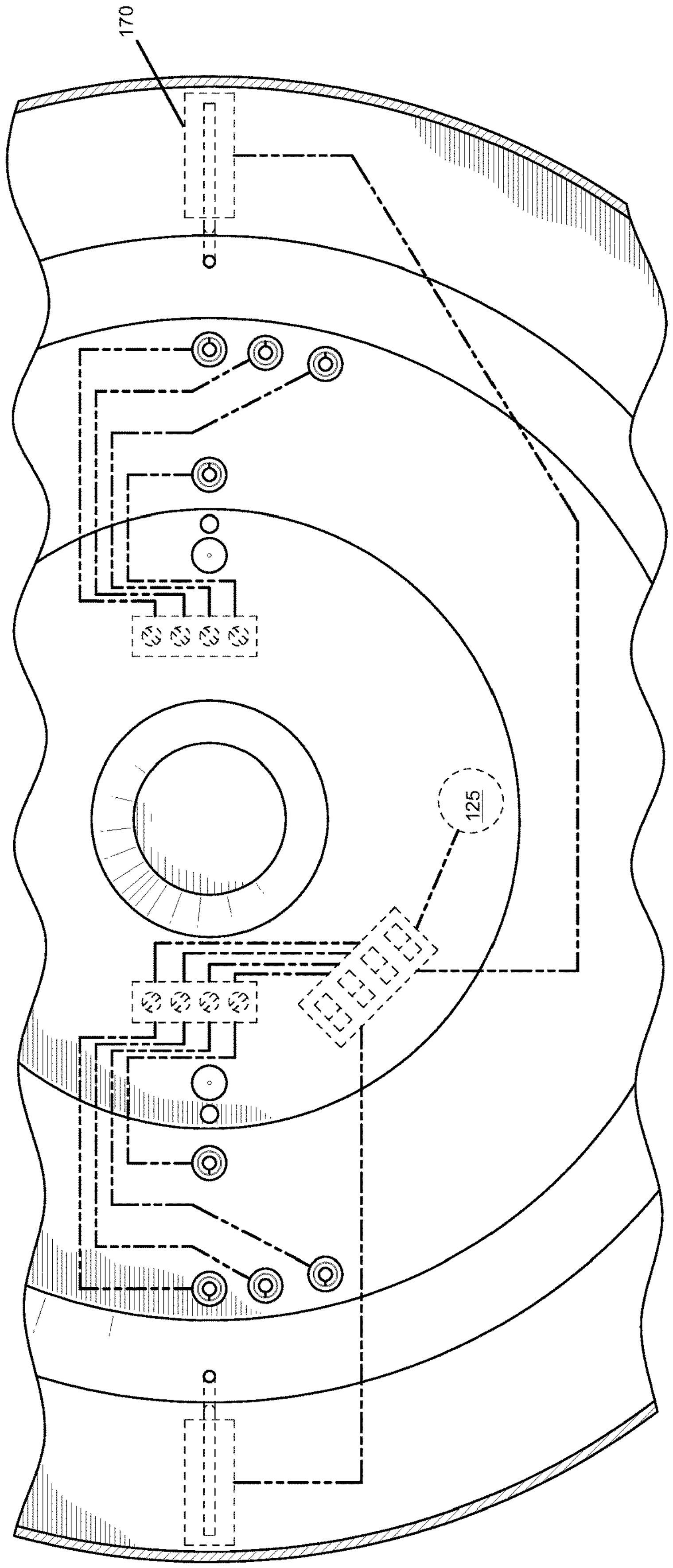
FIG. 4B is an enlarged partial view of FIG. 4A.

FIGS. 4A and 4B are cross-sectional views of the stationary component 100 along direction 4A as shown in FIG. 2. In this embodiment, the deformable power connectors 180 are arrayed in an offset configuration to provide greater distance between the connectors 180 and thus greater safety from electrical hazards. Other embodiments contemplate various alternative configurations of the deformable power connectors, such as radially about the opening 120' or in a linear configuration.

Figure 5:
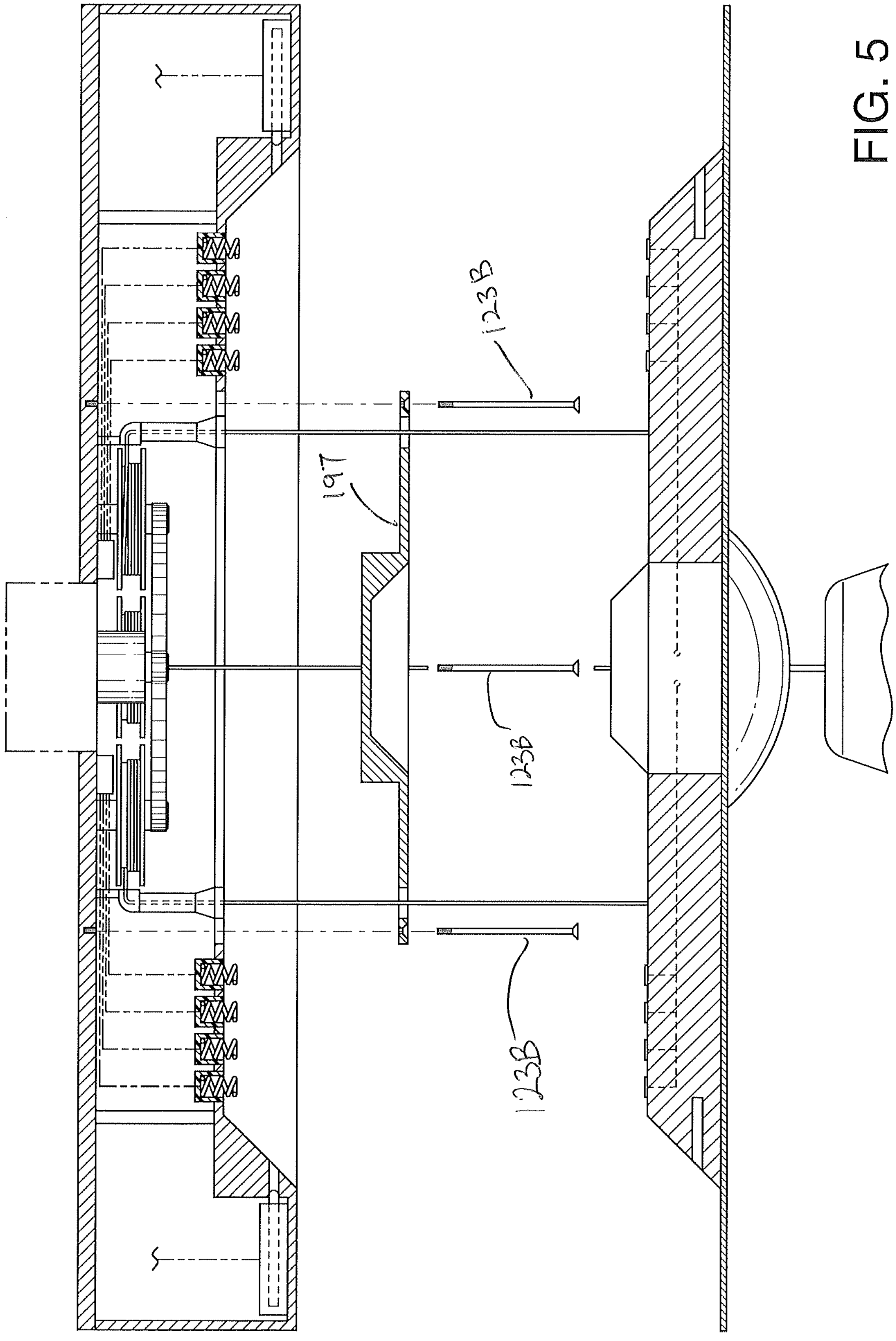
FIG. 5 is an exploded cross-sectional view of the embodiment of FIG. 2 showing an access plate and three plate retaining screws removed so as to permit user access to the stationary component.

FIG. 5 shows an access plate 197 and three plate retaining screws 123B that are used to secure the plate 197 to the stationary component 100. By unscrewing the plate retaining screws 123B and removing access plate 197, a user is able to access the aforementioned user access area, which includes the holes and/or slots 110, screw mounting tabs 122, the terminal strips 185, and the DIP switch 189.

Figure 6:
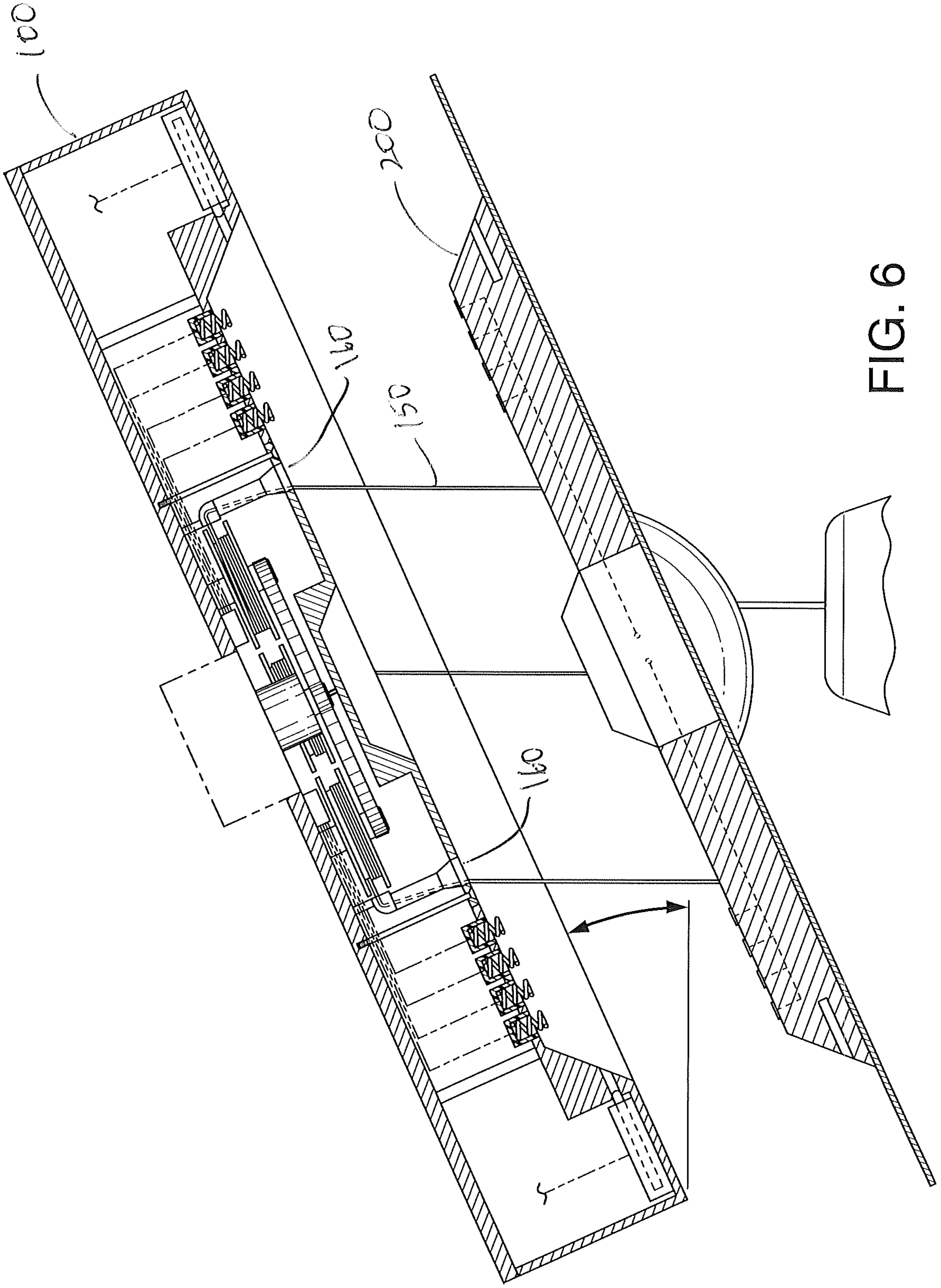
FIG. 6 is a cross-sectional view of an embodiment of the ceiling fixture accessibility device disclosed herein mounted on a non-horizontal surface with the device in an undocked state.

FIG. 6 shows an embodiment in which the stationary component 100 has been mounted on a non-horizontal surface, such as the sloped portion of a ceiling. In this embodiment, since the belt 140 drives all spools at the same rotational speed, the suspension cables 150 will also extend and retract at a uniform speed and hence the moveable component 200 while suspended will maintain the same angle with respect to the horizontal as does the stationary component 100. The elbows 160 are provided with flanged ends that permit the cables 150 to drop vertically and accommodate a wide range of mounting angles.

Figure 7:
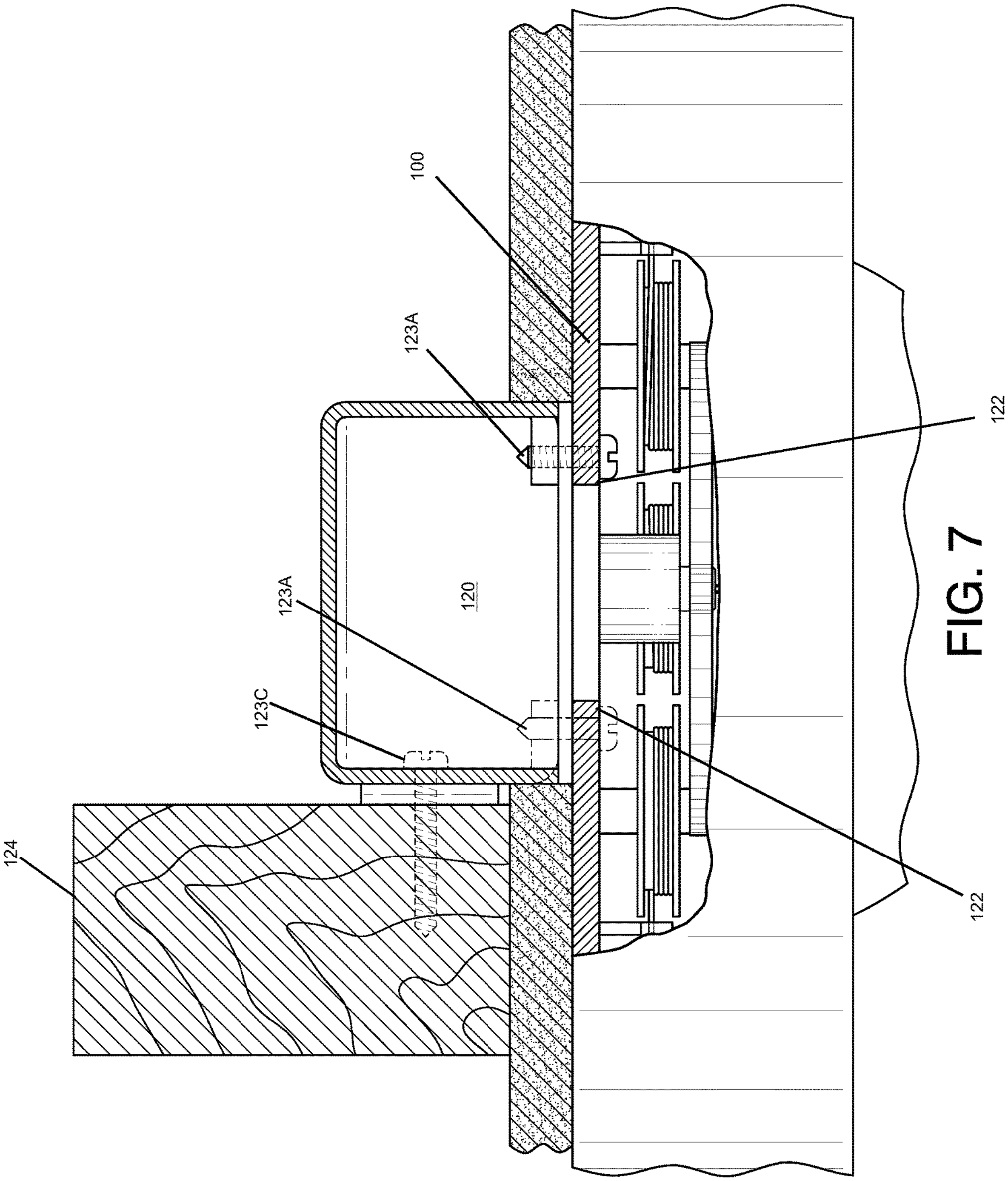
FIG. 7 is a partial cross-sectional view of the embodiment of FIG. 2 showing in detail mounting screws that physically connect the stationary component to a ceiling junction box.

FIG. 7 shows in close detail the physical connection of the stationary component 100 to a ceiling junction box 120 by means of mounting screws 123A. The mounting screws 123A are threaded through mounting tabs 122 and into corresponding screw holes on the junction box 120. The junction box 120 is shown as being secured to a joist 124 via one or more screws 123C.

Figure 8:
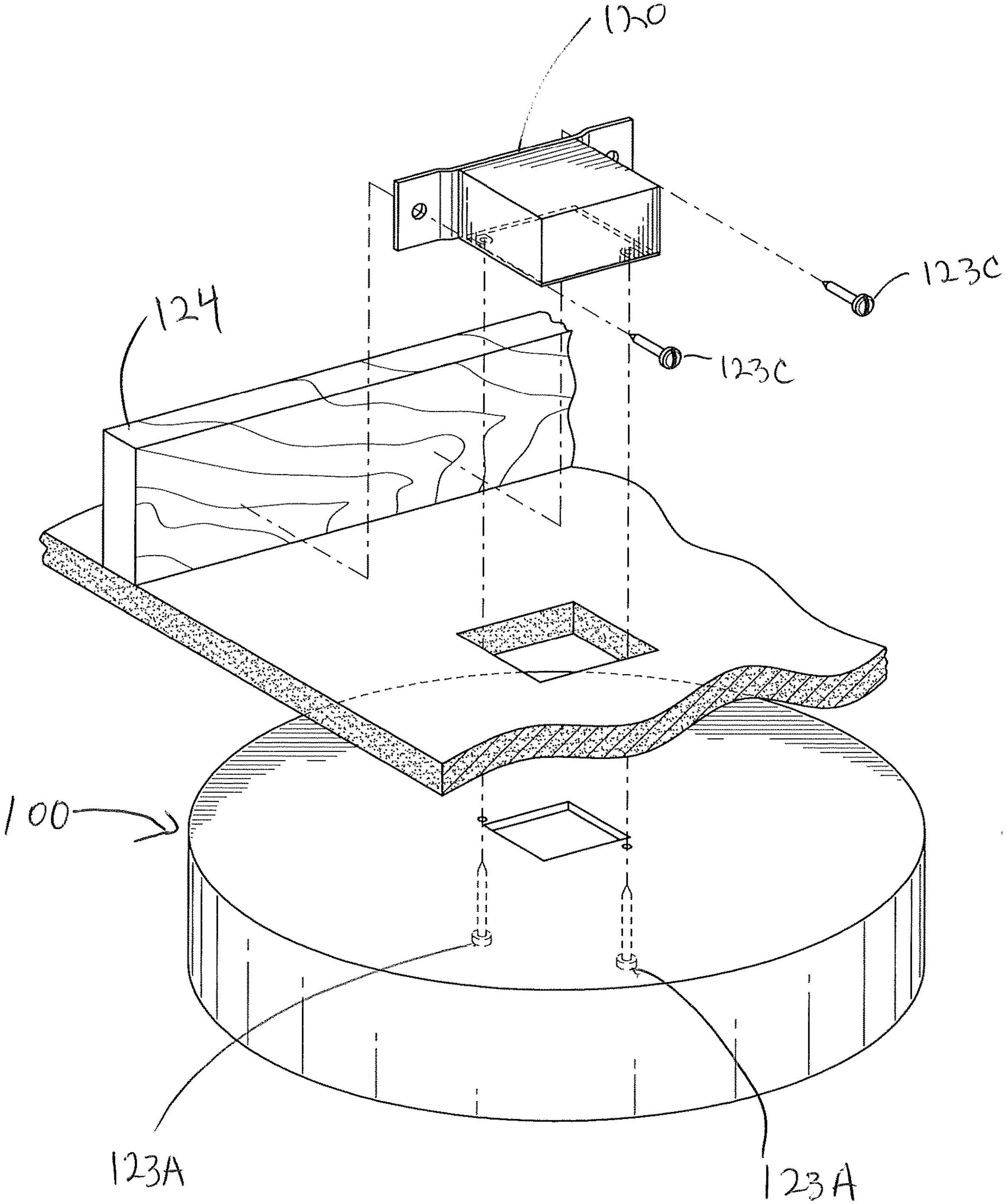
FIG. 8 is an exploded perspective view of the connection of the stationary component to the ceiling junction box and the connection of the ceiling junction box to a ceiling joist.

FIG. 8 shows in further detail the connection of the stationary component 100 to the ceiling junction box 120 and the connection of the ceiling junction box 120 to a ceiling joist 124. Two screws 123C secure the junction box 120 to the joist 124 for added support, and two screws 123A secure the stationary component 100 to the junction box 120.

Figure 9:
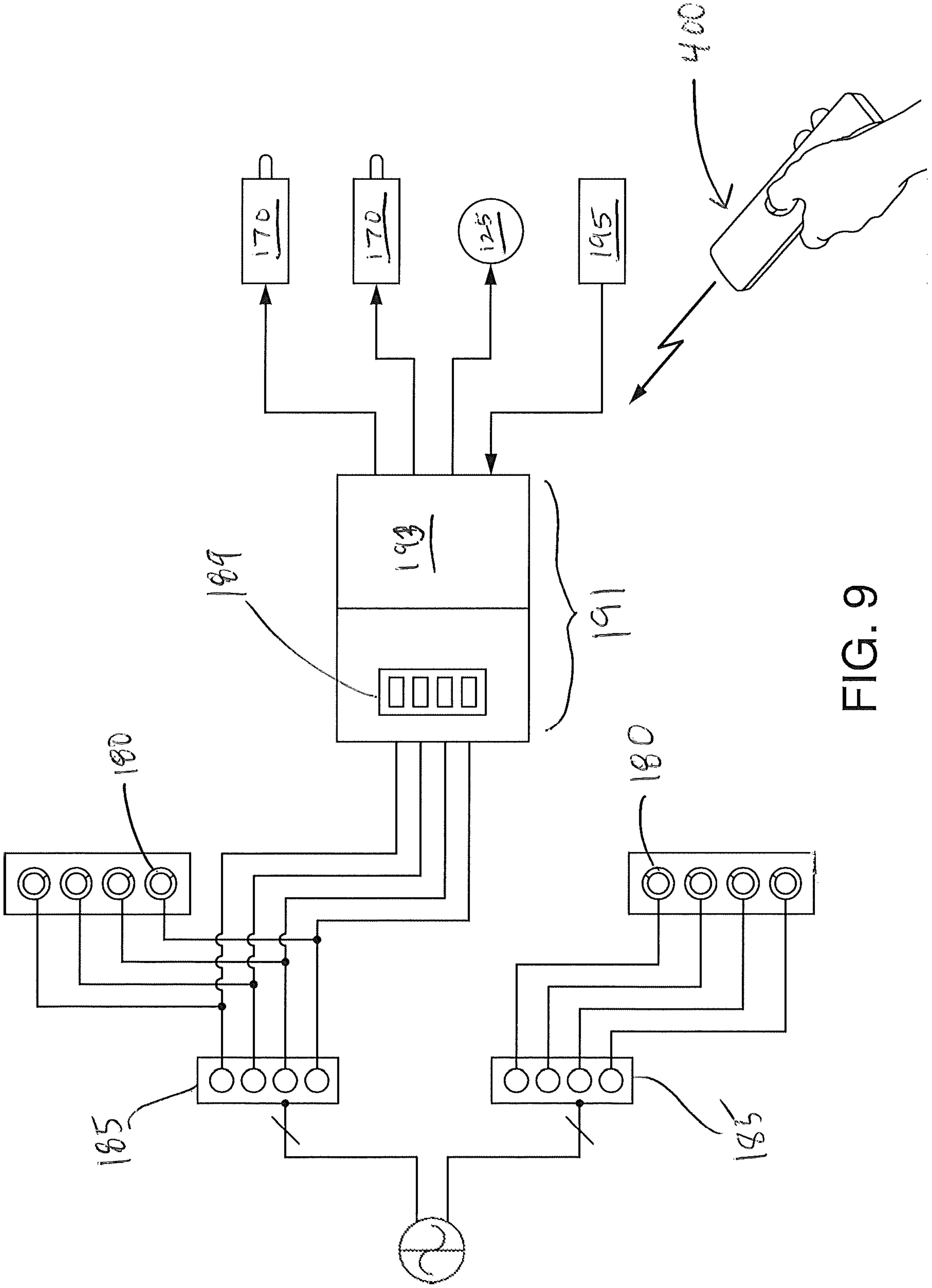
FIG. 9 is an electrical schematic of an embodiment of the ceiling fixture accessibility device disclosed herein.
Figure 12B:
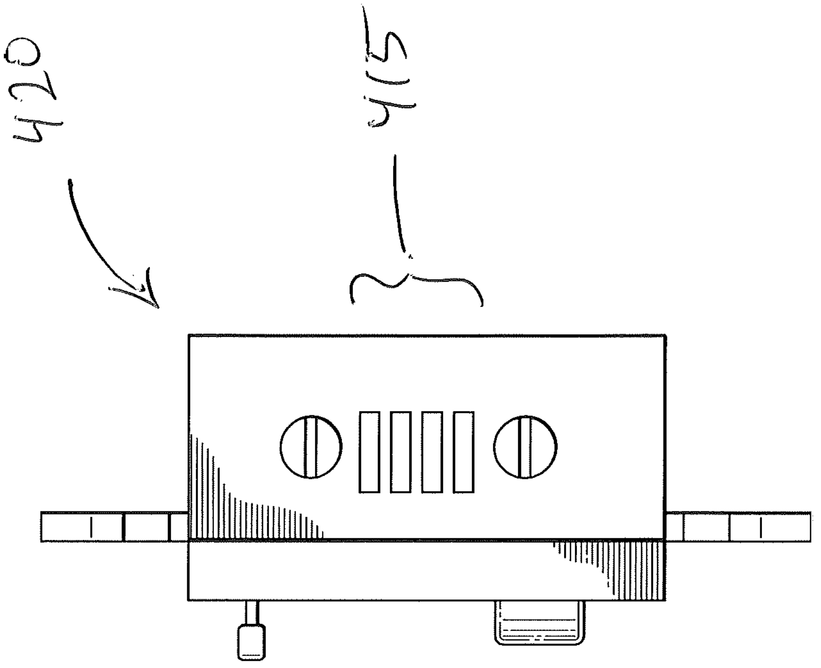
FIGS. 12A and 12B are front and side views, respectively, of a hardwired control device for controlling a single ceiling fixture accessibility device.
Figure 12A:
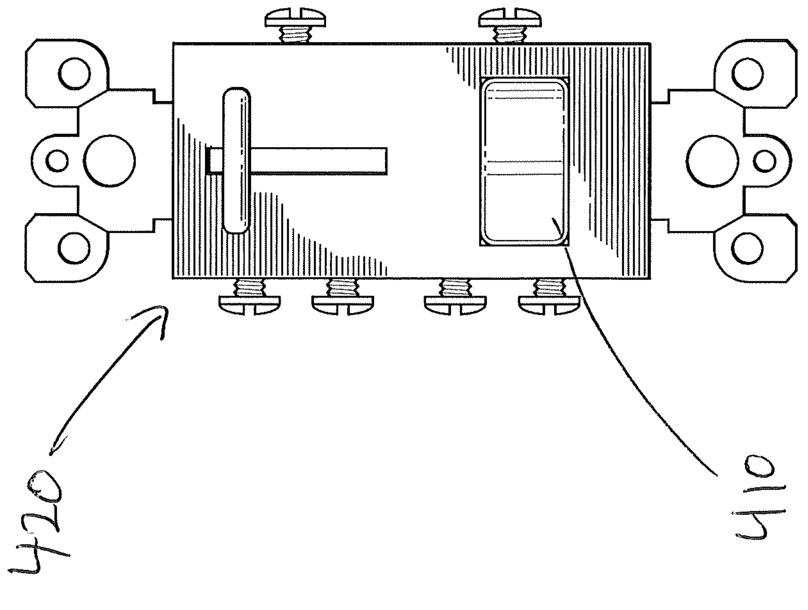
Figure 13:
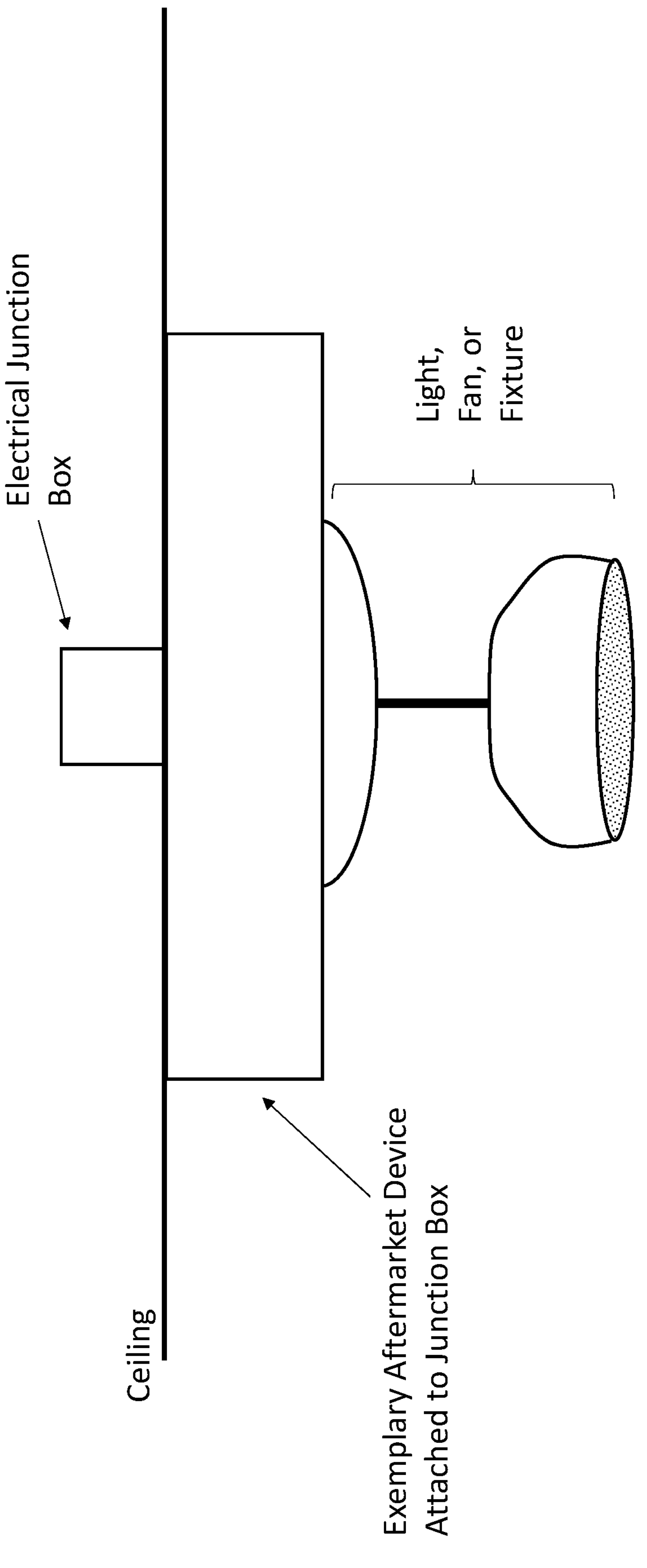
FIG. 13 shows a further alternative embodiment of an aftermarket version of the device showing the device connected to an already existing electrical junction box on a ceiling. The device is shown further connected to an electrical device such as a light, ceiling fan, or other fixture.
Figure 14:
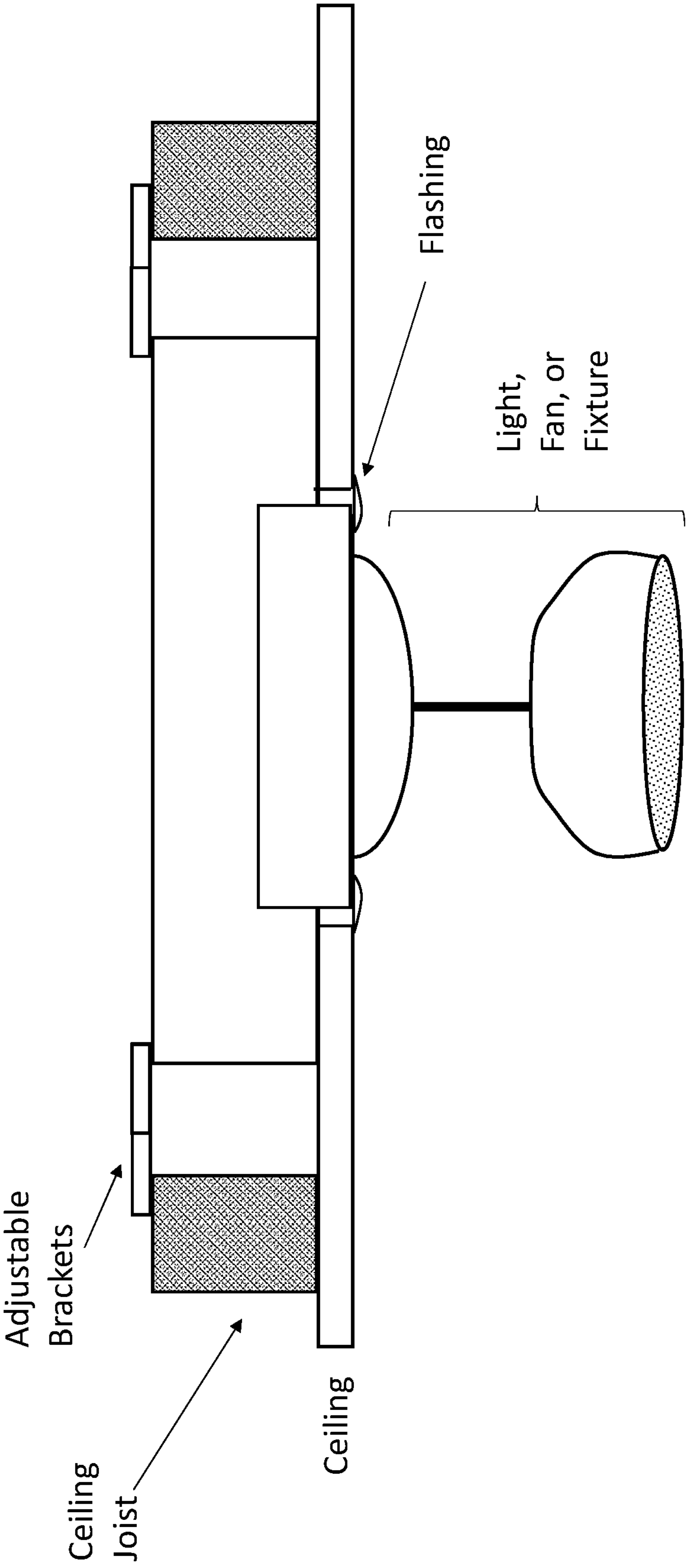
FIG. 14 shows a further alternative embodiment of an original construction version of the device showing the device attached to ceiling joists with adjustable brackets. The device is in a docked state with the moveable component in its fully retracted position with its bottom surface flush or close to flush with the ceiling surface. Flashing is shown attached to the moveable component.
Figure 15:
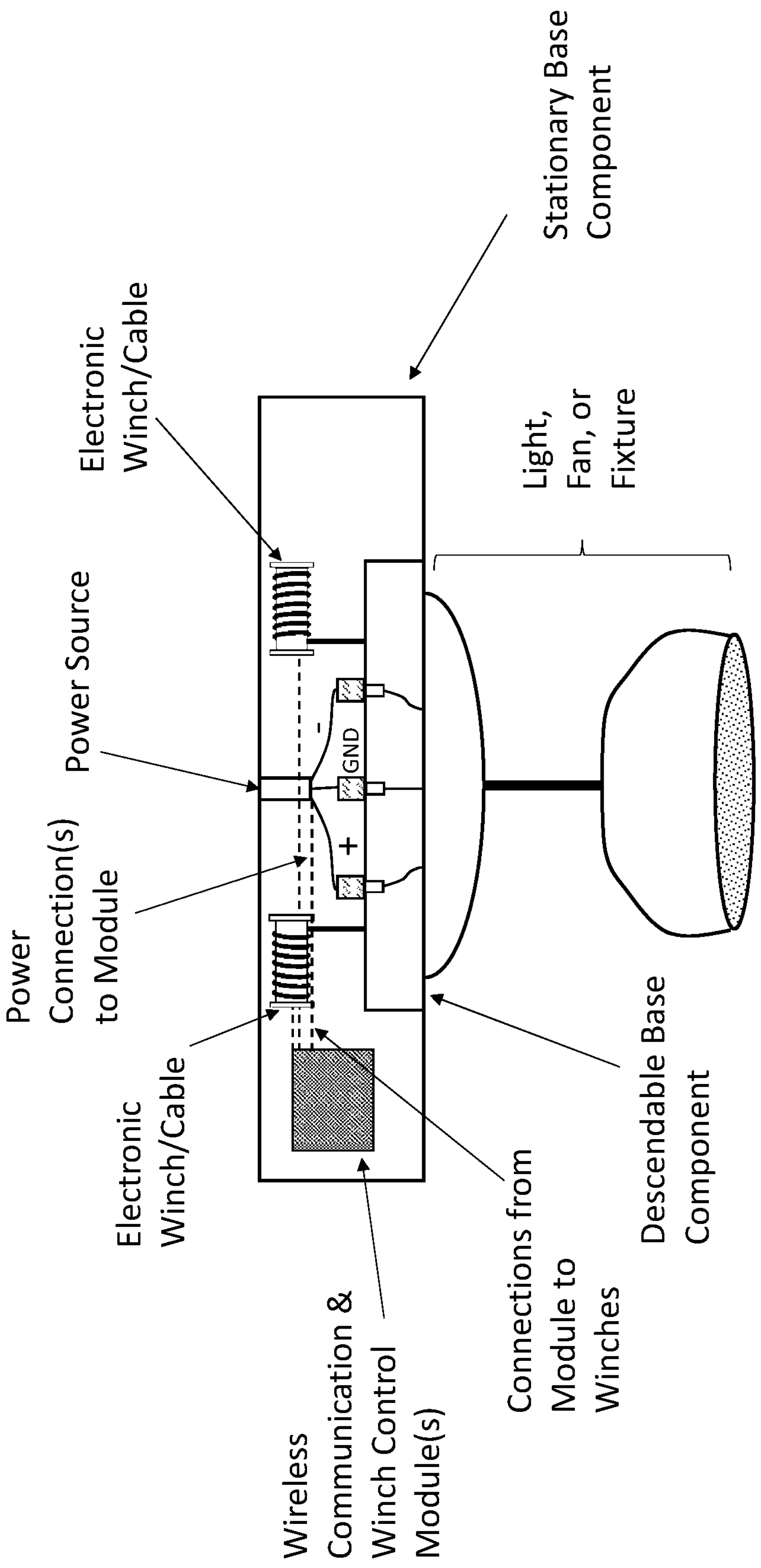
FIG. 15 is a cross-sectional view of an embodiment of the device in a docked state on a ceiling or other out-of-reach surface. This embodiment shows two cables for lowering and raising the moveable component, which are each wound around a spool or drum that is electrically powered and controlled remotely. Also, shown is a power connection from the stationary component to the moveable component via male and female electrical connectors that automatically disconnect when the moveable component is in an undocked state, i.e., lowered from the ceiling, and automatically reconnect when the moveable component is docked to the stationary component. The orientation of any pair of male and female connectors can be reversed.
Figure 16:
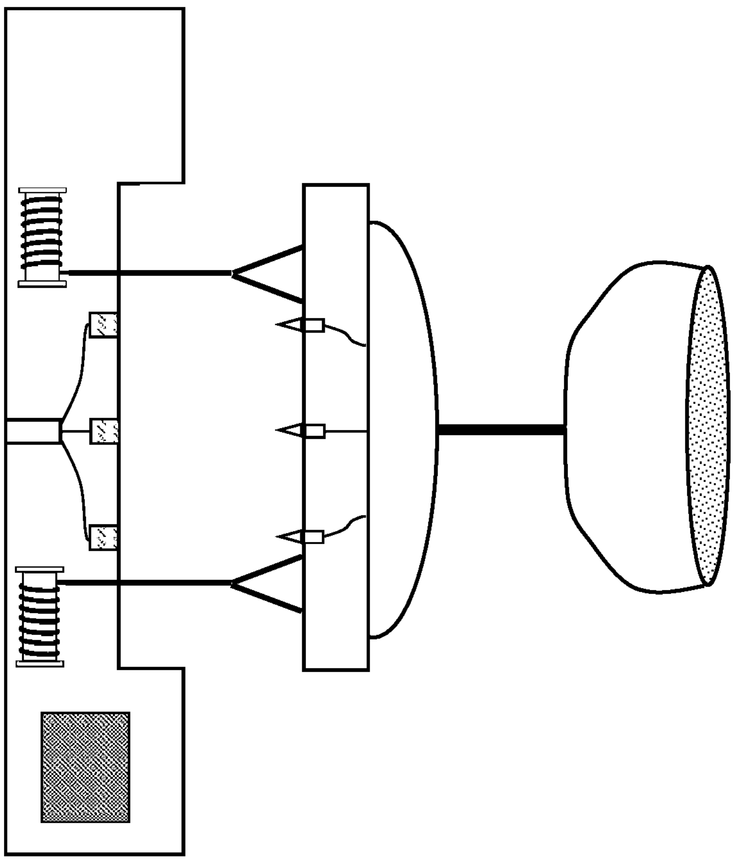
FIG. 16 shows a cross-section of FIG. 15 with the moveable component and associated fixture in a lowered position for access to the fixture. The fixture is shown as disconnected from the power supply when in a lowered position, i.e. an undocked state.

FIG. 9 is a schematic drawing that shows an embodiment of electrical connections between the power lines from the junction box 120 and the stationary component 100. In this embodiment, two 4-wire AC power lines are used to provide power to, for example, a fixture 300 that includes both a ceiling fan and a ceiling light. Depending on the application, other embodiments may contain a fewer or greater number of power lines and corresponding terminals and connectors on the stationary component 100. Here, 4-wire AC power lines are connected from the junction box 120 to 4-wire terminal strips 185. A user would typically connect these power lines to the terminal strips 185 when first installing the accessibility device. Each individual terminal on the terminal strips 185 is connected to an individual deformable power connector 180. A set of power lines from one terminal strip 185 is connected to a control unit 191. The control unit would include an AC-DC converter (not shown), a 4-position DIP switch 189 and various control logic including a microcontroller 193. The microcontroller 193 and various control logic communicate with a remote-control device, such as a wireless remote control 400 (as shown) or, for example, a wired remote control device (as shown in FIGS. 12A and 12B). In response to commands from the remote control, the control unit 191 controls operation of the reversible motor 125 to raise or lower the fixture 300. The control unit 191 is also connected to a proximity sensor 195 that notifies the control unit when the cables 150 have been fully retracted so that the microcontroller 193 can instruct the reversible motor 125 to stop and the pistons 170 to engage with and protrude into the corresponding recesses 230.

Figure 10B:
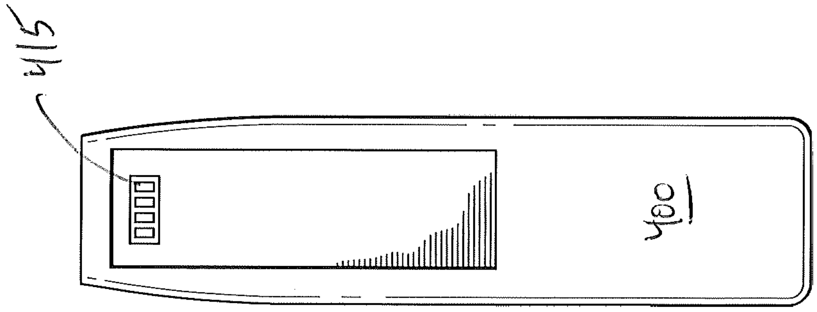
FIGS. 10A and 10B are front and back views, respectively, of an embodiment of a wireless remote-control device for controlling a single ceiling fixture accessibility device.
Figure 10A:
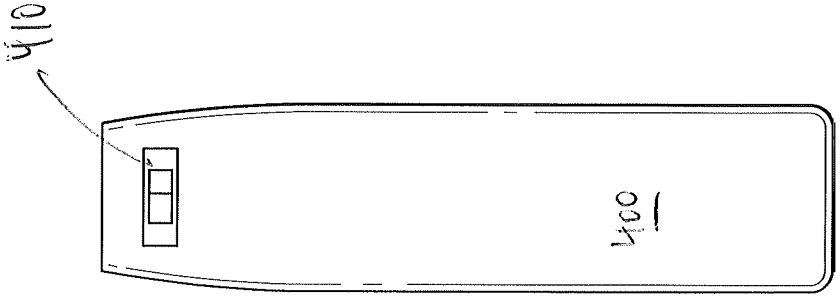

FIGS. 10A and 10B are front and back views, respectively, of an embodiment of a wireless remote-control device 400 for controlling a single ceiling fixture accessibility device. The front of the wireless remote control 400 includes a toggle switch 410 to control the rotational direction of the reversible motor 125 and thus the raising and lowering of the electric fixture 300. Mounted on the rear of the wireless remote control 400 is a 4-position DIP switch 415 that, when set to match the fixture-identifying code of the DIP switch 189 on the stationary component 100, configures the remote control 400 for controlling the fixture 300 attached to said stationary component 100.

Figure 11B:
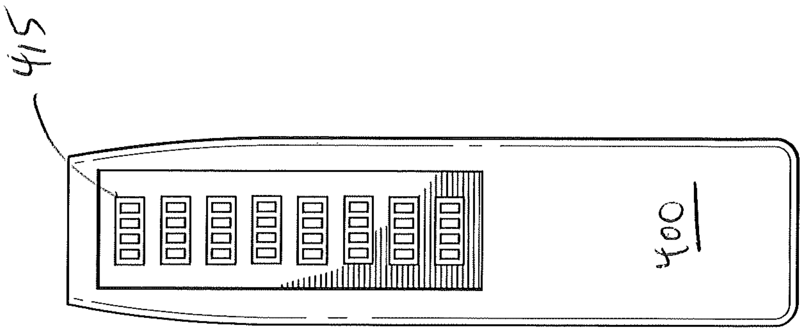
FIGS. 11A and 11B are front and back views, respectively, of an embodiment of a wireless remote-control device for controlling up to eight ceiling fixture accessibility devices.
Figure 11A:
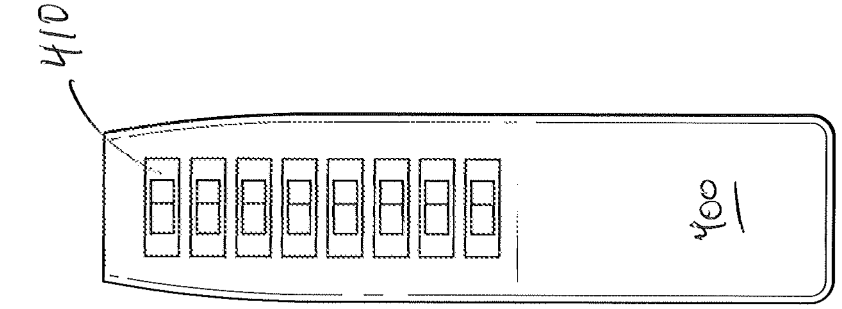

FIGS. 11A and 11B are front and back views, respectively, of an alternative embodiment of a wireless remote-control device 400. In this embodiment, the remote control 400 is provided with eight toggle switches 410 on the front and eight 4-position DIP switches on the rear, to enable control of up to eight ceiling fixture accessibility devices.

A hardwired remote control is also contemplated in some embodiments. FIG. 12A is a front view of a hardwired remote control 420 that is provided with a toggle switch and a dimmer. FIG. 12B is a side view of the hardwired control device and shows a 4-position DIP switch 415 for setting the fixture identifying code.

Exemplary Device Components

| Ref. No. | Description |
|---|---|
| 100 | Stationary component |
| 110 | Holes and/or slots for optional screw or bolt for extra support for heavier electrical fixtures |
| 120 | Ceiling junction box |
| 120' | Opening for ceiling junction box |
| 122 | Tab for mounting screw |
| 123A | Mounting screw(s) that secure the stationary component to the junction box |
| 123B | Plate retaining screw(s) that secure the plate to the stationary component |
| 123C | Screw(s) that secure the junction box to supporting structure such as stud or floor joist |
| 124 | Supporting structure such as a stud or floor joist |
| 125 | Reversible motor (with spindle or other means for driving the belt that rotates the spools). |
| 130 | Spool |
| 140 | Belt |
| 150 | Suspension cable |
| 160 | Elbow |
| 170 | Piston |
| 180 | Deformable power connector (spring) |
| 185 | Terminal strip |
| 189 | 4-position DIP switch |
| 191 | Control unit |
| 193 | Microcontroller |
| 195 | Proximity sensor |
| 197 | Access plate |
| 200 | Moveable component |
| 220 | Mating pad for spring connector |
| 225 | Power lines for supplying power to the fixture 300 |
| 230 | Recess for piston |
| 250 | Auxiliary junction box |
| 260 | Optional decorative face plate |
| 300 | Electric fixture (e.g., light fixture, ceiling fan, etc.) |
| 400 | Wireless remote control |
| 410 | Toggle switch on wireless remote control to control up/down of fixture |
| 415 | 4-position DIP switch for setting fixture identifying code at the remote control |
| 420 | Wired remote control |
| 500 | Stationary component |
| 505 | Main housing |
| 510 | Turntable case |
| 520 | Motor |
| 530 | Turntable assembly |
| 532 | Gear or drive coupler for spool |
| 534 | Multi-channel spool |
| 535 | Spool channel guides |
| 536 | Support cable directional guide |
| 538 | Center shaft |
| 540 | Motor holder |
| 550 | Middle bezel |
| 555 | Movable component |
| 558 | Support cable |
| 559 | Support cable end portion |
| 560 | Moveable base |
| 562 | Piston mechanism |
| 563 | Fittings on moveable component for support cable end portion attachment |
| 570 | Junction box |
| 580 | Bottom plate |

For the original construction and OEM embodiments, refer to FIGS. 13-23, which show additional embodiments of the disclosure. These embodiments are contemplated to various structures and junction boxes and to employ spools and connectors of various shapes and sizes. Yet further embodiments that comprise various sizes and shapes of connectors, motors, connectors and safety locking mechanism may also be contemplated without departing from the gist and scope of the disclosure.

Other Features

The following optional features may be advantageously incorporated into various embodiments within the spirit and scope of this disclosure.

- Housing (alternatively referred to as stationary base unit)
  - Contains the fixed-component portions of the device
  - Comprises slidably adjustable electrical connectors
  - For the original construction version
    - Mounted above the ceiling or on the wall between the joists or studs
  - For the after-market device
    - Fastened to the junction box installed in the ceiling of the structure
  - For the OEM version
    - May have a junction box incorporated and may be mounted above the ceiling or on the wall between the joists or studs
    - May not have a junction box incorporated and may be fastened to the junction box installed in the ceiling of the structure.
- Decorative cover to which device will be attached (alternatively referred to as moveable component)
  - For after-market device
    - Covers the junction box and immediate surrounding area
    - Top is flush with the ceiling and housing containing mechanism extends below the ceiling
  - For original construction version
    - Bottom is flush with the ceiling as it ascends up inside the joists
    - Flashing surrounds it such that there is a clean look at the circumference of the device when raised flush with the ceiling
  - Contains angularly-adjustable electrical connectors
  - Attaches to the fixture via connections in the same size, orientation, and manner as if it were the junction box in the ceiling to which the fixture is attached
  - Out of the box ceiling white, but of a material which allows customer to paint custom colors
- Power strip for connection to building electrical supply
  - Connected to device to allow for internal power supply to fixture
- Internal power connection
  - Male plug conically-shaped rod/female receptacle conically-shaped port to allow for centering/easy positioning of device and 100% certainty of alignment should there be a slight swing/movement of fixture as it is raised
  - +/−/ground (alternatively hot/neutral/ground) connectors to allow for proper power supply considerations
  - Each connector, both male and female, may:
    - Tilt to allow for infinite adjustment of any angle of the ceiling between 0 and 60 degrees
    - Be on a sliding mount/track to allow for movement to allow for and accept different ceiling angles, infinite adjustment between 0 and degrees
    - For each mount, have pre-mark positioning for common ceiling angles, i.e. 15, 30 45 and 60 degrees
- In some alternative embodiments, two (2) or more motorized spools of wire attached affixed to the ceiling mount and to the decorative cover, which will be raised and lowered by engaging the motors with the remote app
  - The fixture will be kept in the same relative position to the plate/motors mounted to the junction box due to it having two anchor points, one for each spool
  - The fixture will be kept level as the end of each wire will attached to a splitter, which will then have two wires which will extend to the corners on their respective side of the inside of the decorative cover. This design allows for four (4) points of contact, keeping the cover to which the fixture is mounted at the same relative angle
    - Attachment points at one end of each split wire (on the same relative side of the cover) will be adjustable to allow for the variable ceiling angle.
      - Each will be infinitely adjustable in-between the limits of the angular adjustment mechanism and in-between the pre-marked adjustments, with pre-marked intervals at 15, 30, 45 and 60 degrees
- Safety mechanism
  - This will be independent of the raising/lowering mechanism to enable independent and redundant safety in conjunction with the tension provided by the motorized spools
  - This will be a piston/stem mechanism that will be engaged:
    - To open upon initial messaging from the app to lower the fixture
    - To close upon contact from closing a circuit when the fixture is in a fully raised position. Alternatively, the device may comprise a switch or sensor to determine whether the fixture is fully raised. The switch or sensor may trigger the piston to close or may communicate with the app to determine whether the piston should be closed.
  - The stem will be attached to the inside of the decorative cover and have a hole to receive the piston which will be positioned such that the housing and decorative cover are fully mated when in the closed position
  - The piston and stem will be mounted on similar mechanisms as the electrical connections to allow for a variable angle of the ceiling
- Control App
  - This will be an iOS/Android app to allow for:
    - Wireless connectivity to n-number of devices connected to a household or local network
    - Control of raising and lowering the fixture at user specific intervals or infinite variability
    - Alerts if a fixture is lowered and there is a safety issue, e.g. not an intentional action These foregoing optional features may be further combined in any appropriate manner as would be appreciated by a person skilled in the art.

Further Exemplary Embodiments

Figure 17:
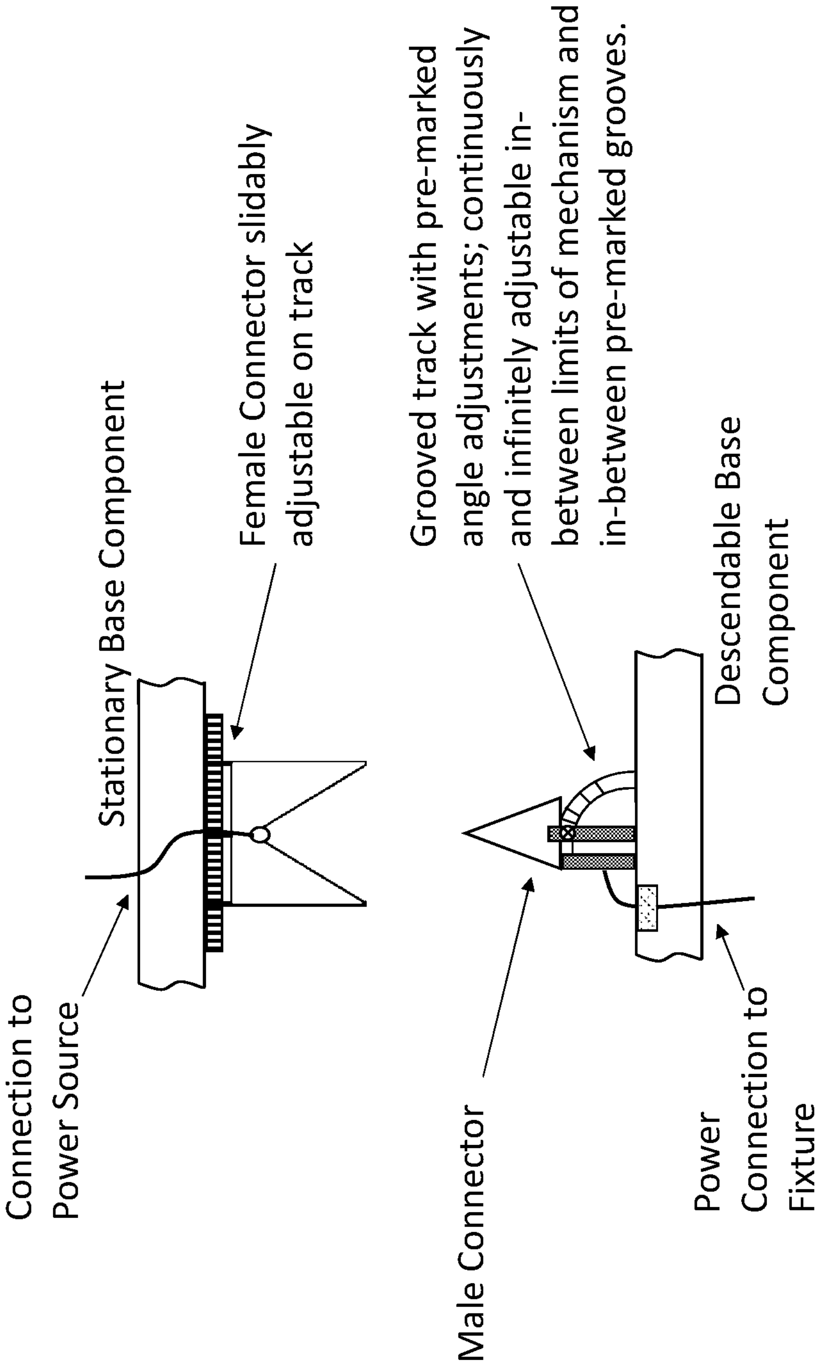
FIG. 17 shows an embodiment of male and female connectors which can provide for adjustments based on angled orientation of the device, for example when the device is mounted on a non-level ceiling or angled surface. The male and female connectors are shown on the moveable component and stationary component, respectively, and can optionally be reversed. That is to say, the male connectors may alternatively be disposed on the stationary component and the female connectors may alternatively be disposed on the stationary component. The female connector is shown on a straight stationary track and is slidably adjustable. The male connector is shown on a grooved track to allow for a plurality of angular adjustments.
Figure 18:
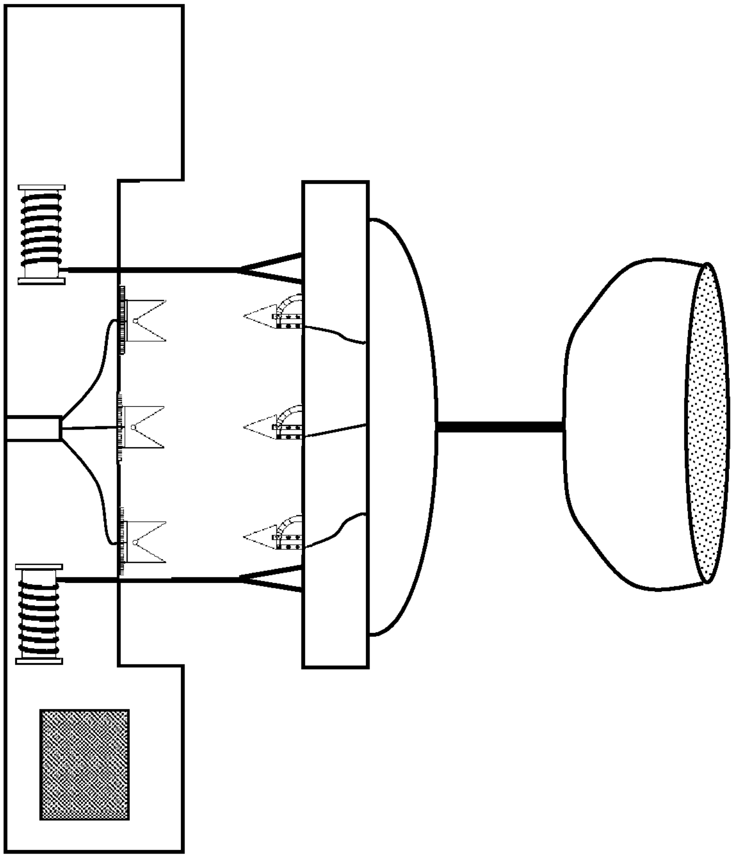
FIG. 18 shows a cross-section of an embodiment comprising the male and female connectors of FIG. 17. The moveable component is shown in a lowered position (undocked state).
Figure 19:
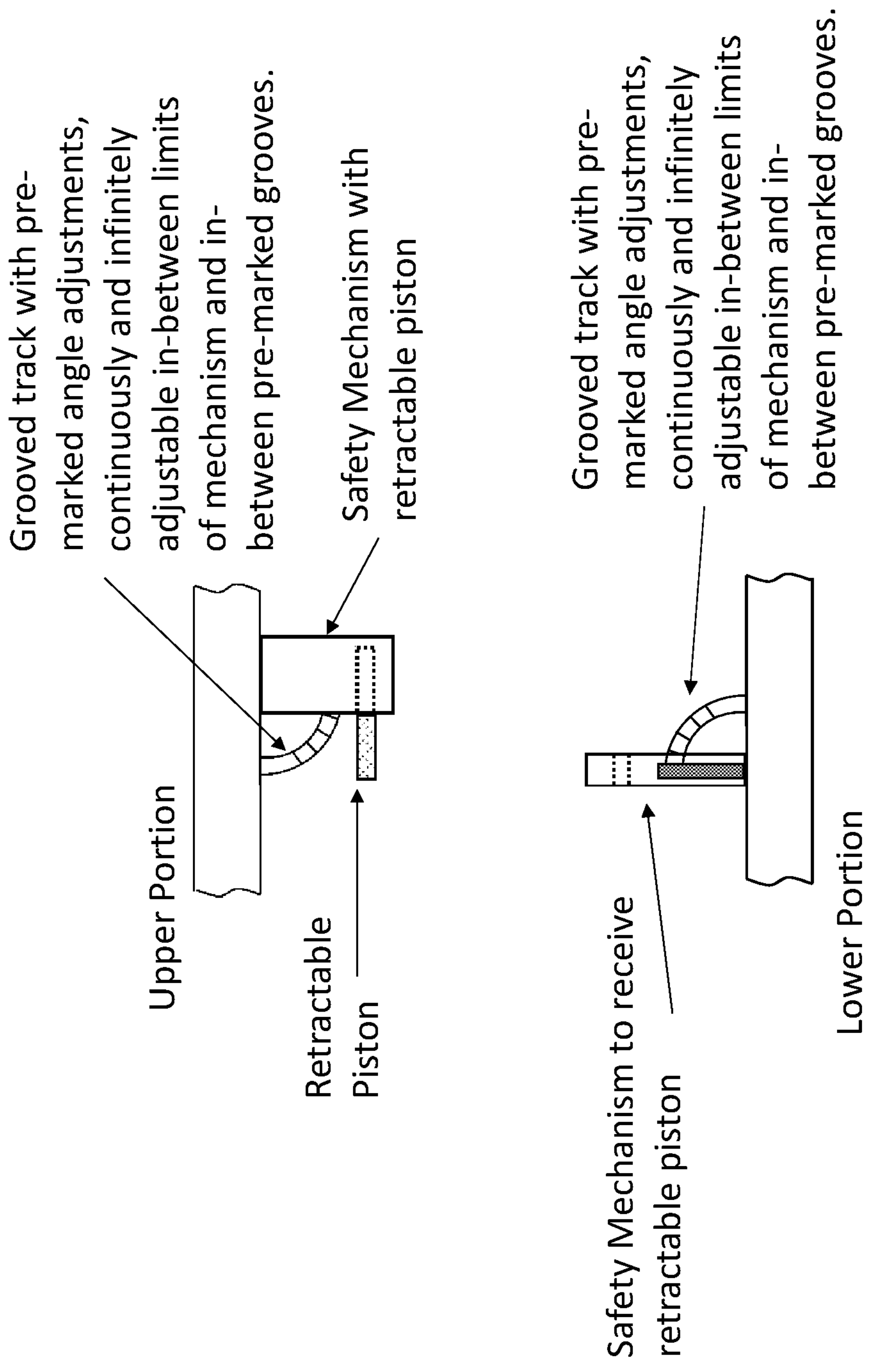
FIG. 19 shows an embodiment of a piston-post piston-activated safety mechanism for disengaging and reengaging the components of the device. The safety mechanism can be incorporated into any embodiment to secure the stationary component to the moveable component in its docked state.

In alternative embodiments the male and female electrical connectors may be adjustable so that the moveable component can properly engage with the stationary component when it is mounted on a non-horizontal surface. An embodiment of adjustable male and female connectors is shown in FIG. 17. The view shown in FIG. 17 is cross-sectional. The male connector may have a conical shape and may engage with a female connector having a conical cavity. The conical cavity of the female connector may be larger than the conical male connector so that the female connector can accommodate the male connector at multiple orientations.

The female connector may be attached to the stationary base component via a track or equivalent mounting system that allows for the connector to be slidably adjusted. The track may be mounted to the stationary base component in an orientation that provides for slidable adjustment of the female connector in the desired direction. In some embodiments, the track may be rotated or attached in different orientations so that the female connector can be secured in various positions.

The male connector may be attached to the moveable component via an angular adjustment mechanism. The angular adjustment mechanism may comprise a grooved track with pre-marked adjustments and may be infinitely adjustable in-between the limits of the angular adjustment mechanism and in-between the pre-marked adjustments. The pre-marked adjustments may be at common ceiling or mounting surface angles such as 15°, 30°, 45°, and 60° from vertical as depicted in FIG. 17. It can be appreciated that various designs for the male connector and angular adjustment mechanism are contemplated so long as the male connector can be angularly adjusted in at least one direction. The angular adjustment mechanism may also comprise a vertical adjustment mechanism that allows the male connector or the angular adjustment mechanism to be moved vertically relative to the moveable component while maintaining electrical connection to the fixture. The angular adjustment mechanism may be rotated or attached to the moveable component in different orientations to give the male connector a hemispherical range of adjustment.

The male connector and angular adjustment mechanism is not restricted to being mounted on the moveable component and may be mounted to the stationary base component instead. In embodiments where the male connector and angular adjustment mechanism are mounted on the stationary base component, the female connector and adjustment track may be mounted on the moveable component. In some embodiments, the female connector may further comprise an angular adjustment mechanism. In some embodiments, the directionality of connectors may be mixed, meaning that a particular component has one or more male and one or more female connectors and the complementary connectors are arranged appropriately on the other component to make an electrical connection when the moveable component is retracted.

In some embodiments, the male and female connectors are engaged when the moveable component is fully retracted. In some embodiments, the engaged connectors rotationally lock the moveable component so that a fan or other fixture with moving components can be attached. In some embodiments, one or more non-electrical engaging connectors may be included to rotationally lock the moveable component in its retracted position. In some embodiments, the attached winch cables may primarily or further prevent rotational movement of the moveable component.

In further embodiments, ceiling fixture accessibility devices includes one or more rotatable spools engaged with two or more support cables. In further embodiments, a single pulley or spool having multiple channels for accepting one or more support cables. In an embodiment, the ceiling fixture accessibility device has at least two support cables, and therefore includes a spool having at least two channels. In an embodiment, the ceiling fixture accessibility device has two support cables, and therefore includes a spool having two channels. In an embodiment, the ceiling fixture accessibility device has three support cables, and therefore includes a spool having three channels. In an embodiment, the ceiling fixture accessibility device has four support cables, and therefore includes a spool having four channels.

Figure 24:
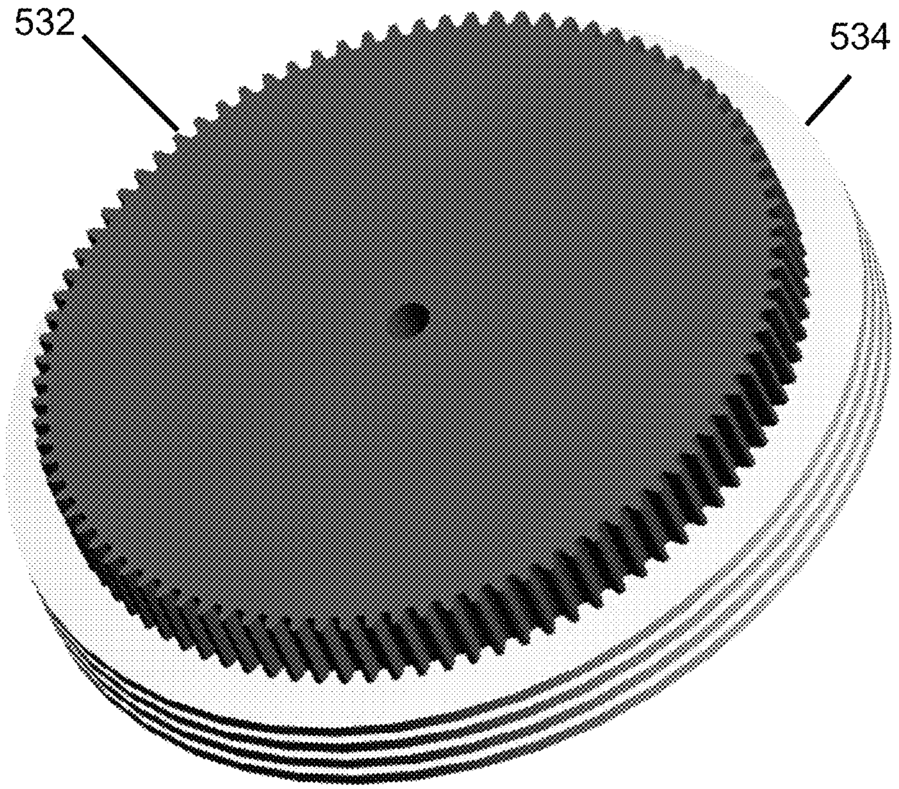
FIG. 24 shows an exemplary embodiment of part of a turntable assembly which may be incorporated into an electrical fixture accessibility device or hoist mechanism, this part of the turntable assembly including a gear coupled with a multi-channel spool having three channels.

FIG. 24 shows an exemplary embodiment of a gear 532 coupled with a multi-channel spool 534 having three channels. The three cables (not shown) which raise and lower the descendible portion (movable component) will be spooled in the multi-channel spool. By having independent cables wound on the same component, when the turntable is rotated via a motor spinning the coupled gear, the length extended for each cable will always be substantially equal allowing the movable component to maintain the angle of the ceiling upon which the stationary component is mounted. In some embodiments, three equally or symmetrically-descending cables are arranged symmetrically around the movable component for stability and to avoid tipping while descending/ascending such as if only two cables are used. Alternatively, more than three cables may be used. In an embodiment, the gear 532 may interface at its outer circumference with a complementary gear of a motor. In an alternative embodiment, the gear 532 may have recessed or inlaid teeth for interfacing with a motor. Any alternative means for turning spool 534 by a motor are contemplated, including the spool being directly geared at its outer circumference or top, or alternatively the spool being directly driven by a center shaft.

Figure 25:
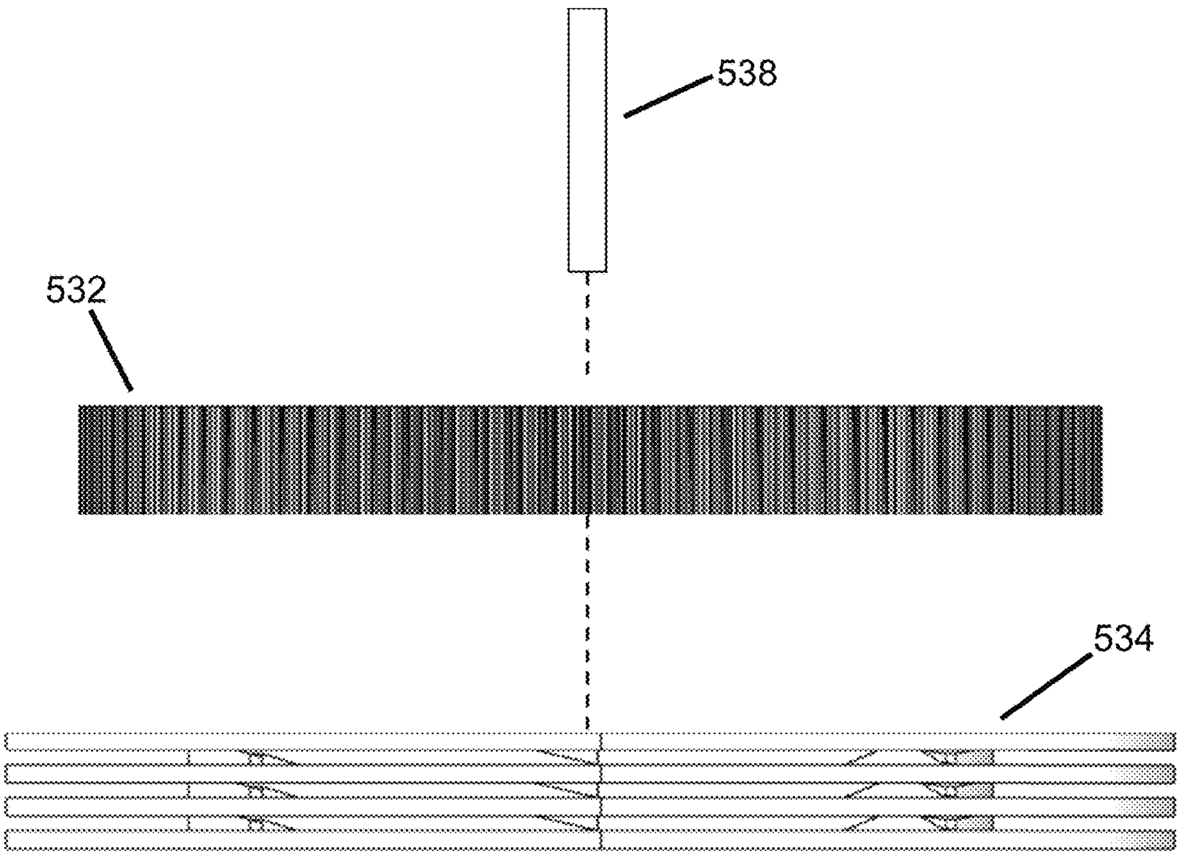
FIG. 25 shows an exemplary exploded view of part of a turntable assembly which may be incorporated into an electrical fixture accessibility device or hoist mechanism, the exploded view showing a gear, multi-channel spool, and center shaft.

FIG. 25 shows an exemplary exploded view of a gear 532, multi-channel spool 534, and center shaft 538. In various embodiments, the center shaft may include or engage with bearings for the gear 532 and spool 534. In various embodiments, the center shaft may couple directly with the gear 532 and spool 534 at one end and with a motor at its other end to drive the spool. In alternative embodiments, the gear 532 and spool 534 are integrated into a single component as described herein.

Figure 26:
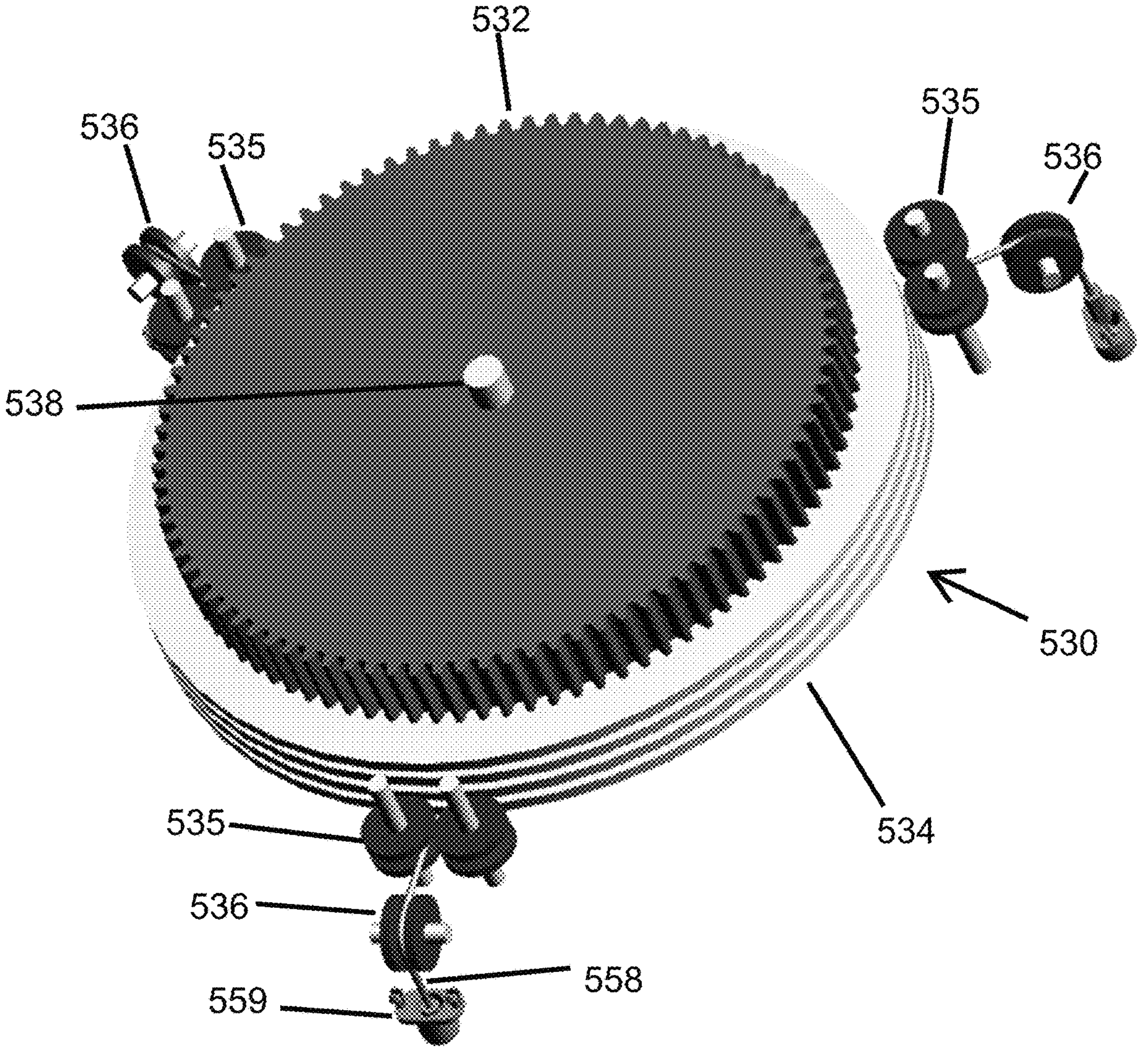
FIG. 26 shows an exemplary embodiment of a turntable assembly which may be incorporated into an electrical fixture accessibility device or hoist mechanism including support cables and guides for aligning the support cable with a respective channel and orienting the support cable in a direction substantially parallel with an axis of rotation of the gear and spool.

FIG. 26 shows an exemplary embodiment of a turntable assembly 530 including support cables 558 and guides 535, 536 for aligning the support cable with a respective channel and orienting the support cable in a direction substantially parallel with an axis of rotation of the gear and spool. The guides 535 may be referred to as spool channel guides and guides 536 may be referred to as directional guides. As the turntable rotates and extends or retracts the cables, each cable will have a set of guides 535, 536 (three sets substantially equidistant (i.e. spaced evenly circumferentially around the turntable) from each other) which change the vector of the cable from parallel to the turntable to an approximately 90° drop, or substantially perpendicular to the plane of the turntable (which is substantially parallel with an axis of rotation of the gear and spool). The support cables each have an end 559 which may couple with a movable component.

Figure 27:
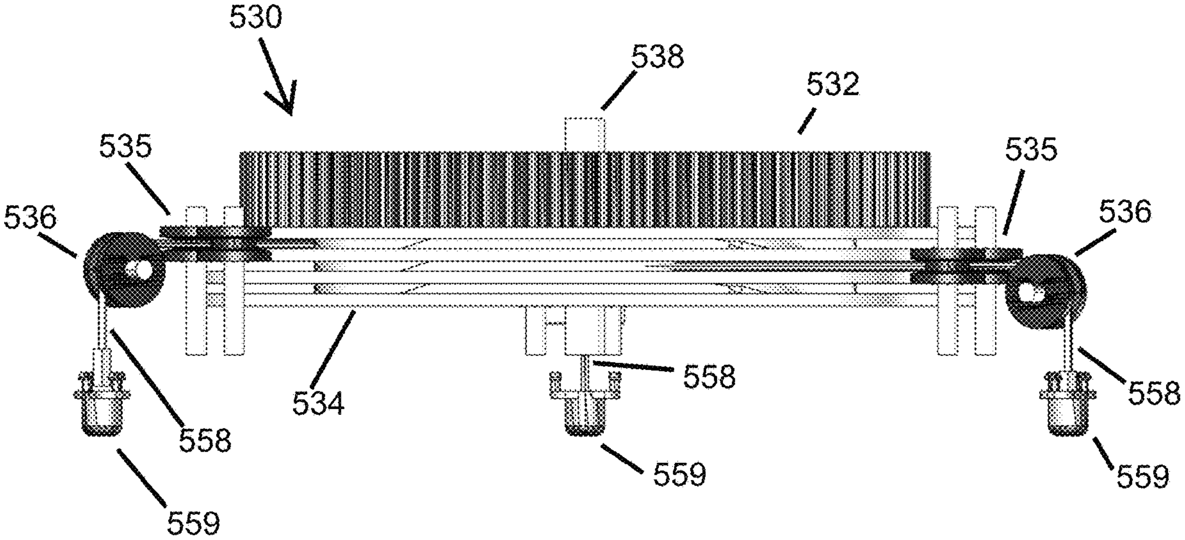
FIG. 27 shows an exemplary side view of a turntable assembly.

Generally, the guides 535 are aligned with the respective channel of the spool 534 to guide the respective support cable 558 into the respective channel. That is, each of the three guides 535 are placed at a different height relative to one another so that each guide 535 directs is respective support cable into a different respective channel of the spool 534. The guide 536 generally directs the support cables downward from the stationary component (that is, in a direction substantially perpendicular to the stationary component and turntable 530, or in a direction substantially parallel with the axis of rotation of the turntable 530 or spool 534). The terms "substantially parallel" and "substantially perpendicular" in this context should be understood to include deviations when the stationary component is mounted on an uneven or angled surface. Because the movable component attached at the ends 559 of the support cable 558 will be at substantially the same angle as the stationary component, ceiling, and turntable, it can be said that its orientation is "substantially perpendicular" with an axis or rotation of the turntable or "substantially parallel"

with the stationary component 500, turntable 530, spool 534, and gear 532. FIG. 27 shows an exemplary side view of a turntable assembly 530. The different relative heights of the guides 535 compared to the channels of the multi-channel spool 534 are visible from this side view.

Figure 28:
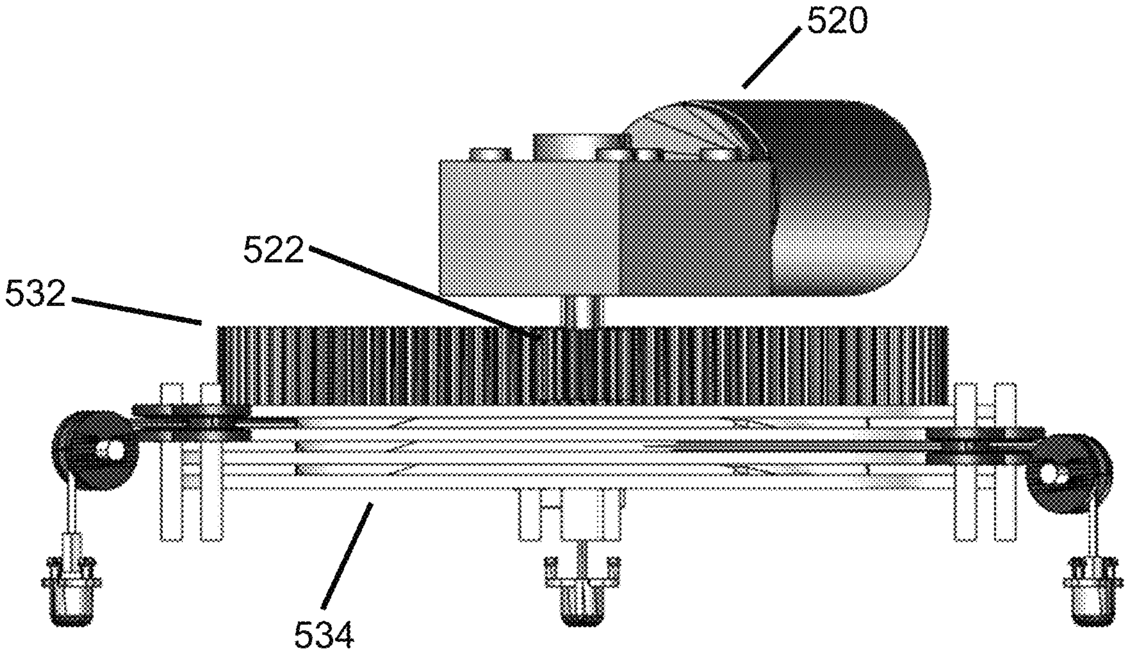
FIG. 28 shows an exemplary side view of a turntable assembly engaged with a motor.

FIG. 28 shows an exemplary side view of a turntable assembly engaged with a motor 520. This embodiment shows the motor 520 which spins an attached gear 522 which in turn spins the turntable via the integrated gear 532 of the turntable thus extending and retracting the support cables spooled on the multi-channel spool. In various embodiments, the motor may be coupled to the turntable via a belt, chain, or any other means. In general, any motor or mechanism capable of rotating the multi-channel spool is contemplated.

Generally, the turntable 230 including the multi-channel spool 534 may be incorporated into any type of housing or configuration such that a movable component may be raised or lowered relative to a stationary component. In some embodiments, the turntable may be utilized in an electrical fixture accessibility device which may be used with an electrical fixture. In alternative embodiments, the turntable 230 including a multi channel spool 534 may be used in non-electrical applications such as a hoist. For example, certain non-electrical articles might be coupled with a hoist, such as an artistic detail, a suspended planter for plants, etc. In even further alternative embodiments, hoist devices include no movable component, but do include ends 559 of support cables 558 which may be lowered or raised. In such embodiments, the devices are generally useful to raise or lower any article which a user attaches to the ends of the support cables. In any embodiments, the relative positions of the cable ends 559 may be tuned or adjusted by adjustment mechanisms at the multi-channel spool 534 for each of the support cables 558. As an example, the user may attach the cable ends 559 to an artistic piece to raise or lower it for display purposes. Devices herein may be modular and have attachable, removable, or replaceable movable components so that the hoist may be used for various applications. For example, an alternative movable component may contain a built-in light or other electrical device, or may not contain an electrical connector, etc.

That is, the turntable assembly is useful in electrical accessibility devices which provide power, in a docked state, to attached electrical fixtures, or in various “hoist” embodiments where the movable component does not supply power to an attached fixture or article, or in various “hoist” embodiments where there is no movable component and the device provides for cable ends for attachment to an article. While the term “hoist” more broadly includes embodiments which may not include power transmission to a movable portion, such as in an electrical fixture accessibility device, it is not intended to limit such “hoist” devices (that is, a “hoist” device may also include some means to provide power to a movable component or portion). An electrical fixture accessibility device may therefore rely on some aspects of a “hoist”, or include certain portions of a “hoist”.

Figure 29:
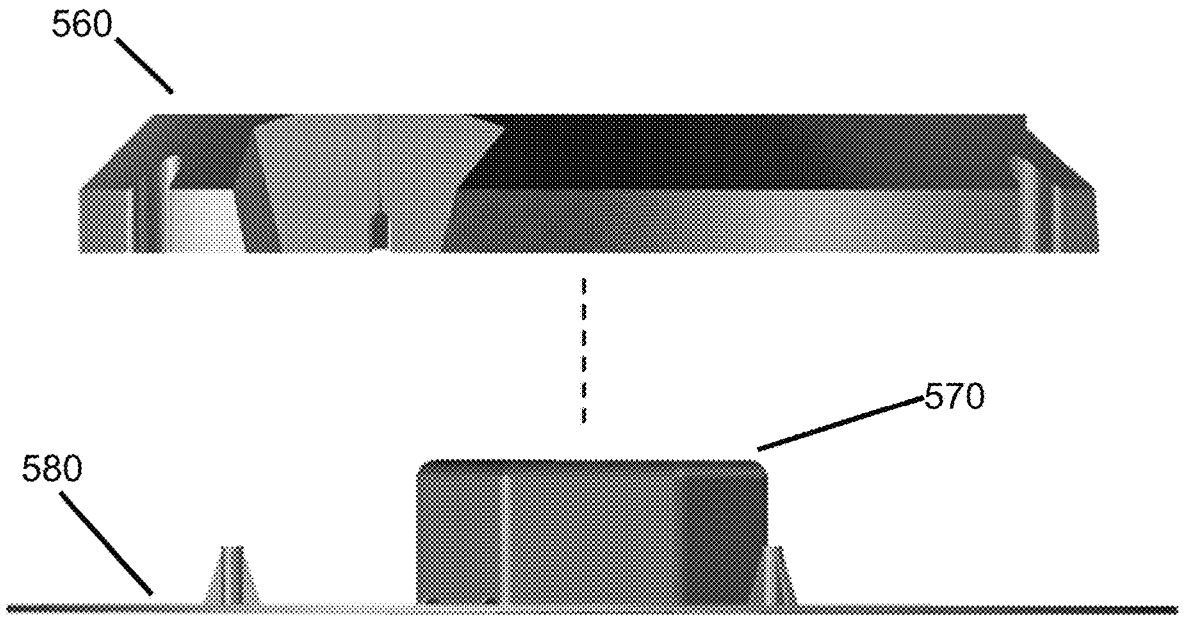
FIG. 29 shows an exemplary exploded side view of a movable component.
Figure 30A:
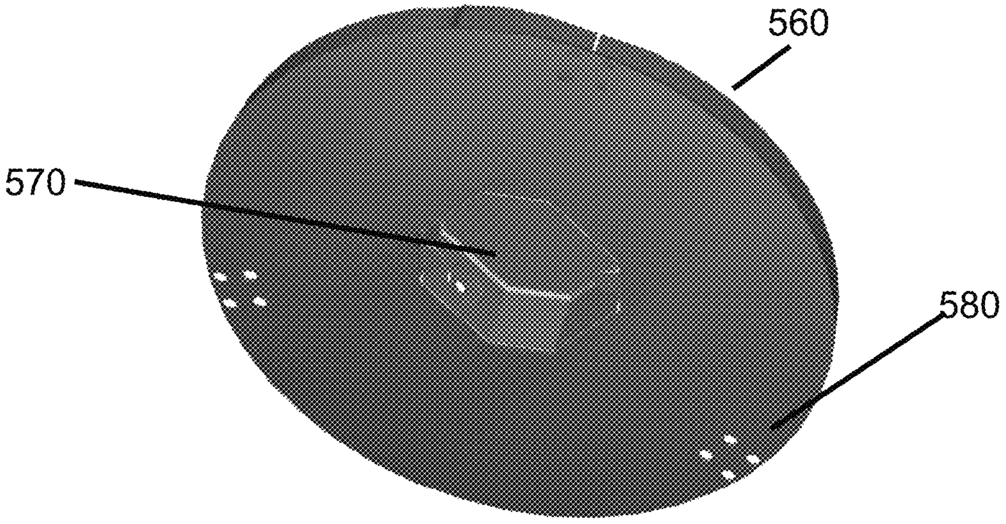
FIG. 30A shows an exemplary embodiment of a movable component with integrated junction box to which a standard electrical device such as a light fixture may be coupled.
Figure 30B:
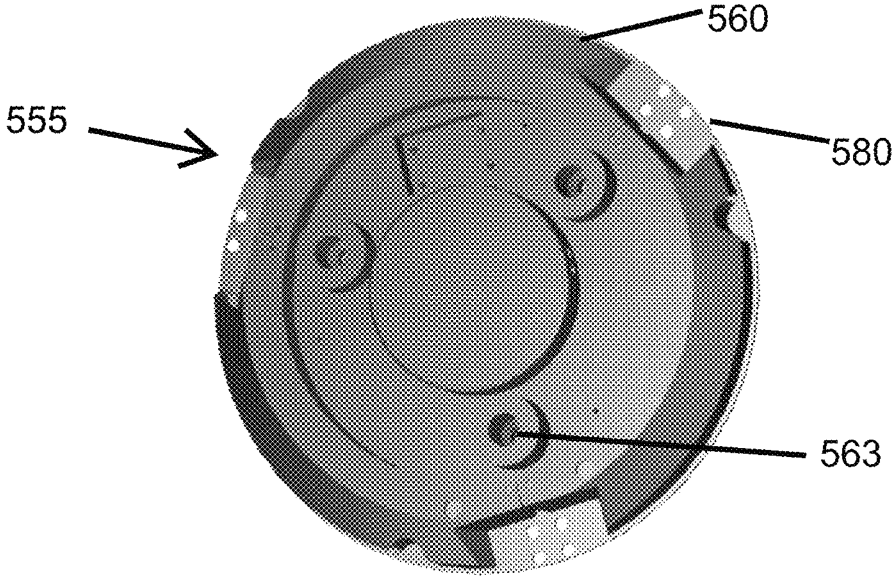
FIG. 30B shows an exemplary embodiment of a movable component.

FIG. 29 shows an exemplary exploded side view of a movable component (alternatively referred to as a descendible portion). This shows the lower unit, or bottom, 560 which, when raised and lowered by the cables, nests within the middle bezel 550. In an embodiment, the bottom plate 580 engages with the lower unit 560. In an embodiment, the lower unit has an integrated or attached junction box 570 to which an electrical fixture may attach. FIGS. 30A and 30B show exemplary embodiments of a movable component 555, although any configuration of a movable component is contemplated. The movable component 555 generally interfaces with the support cable(s). In an embodiment, the movable component 555, and more particularly the lower unit 560, interfaces with the support cable(s) at one or more fittings 563. Generally, any means of attaching the movable component 555 to the support cables 558, or their cable ends 559 is contemplated. The attachments include, but are not limited to, press-fittings, screw fittings, clamps, welds, or any other appropriate means of attachment.

Figure 31:
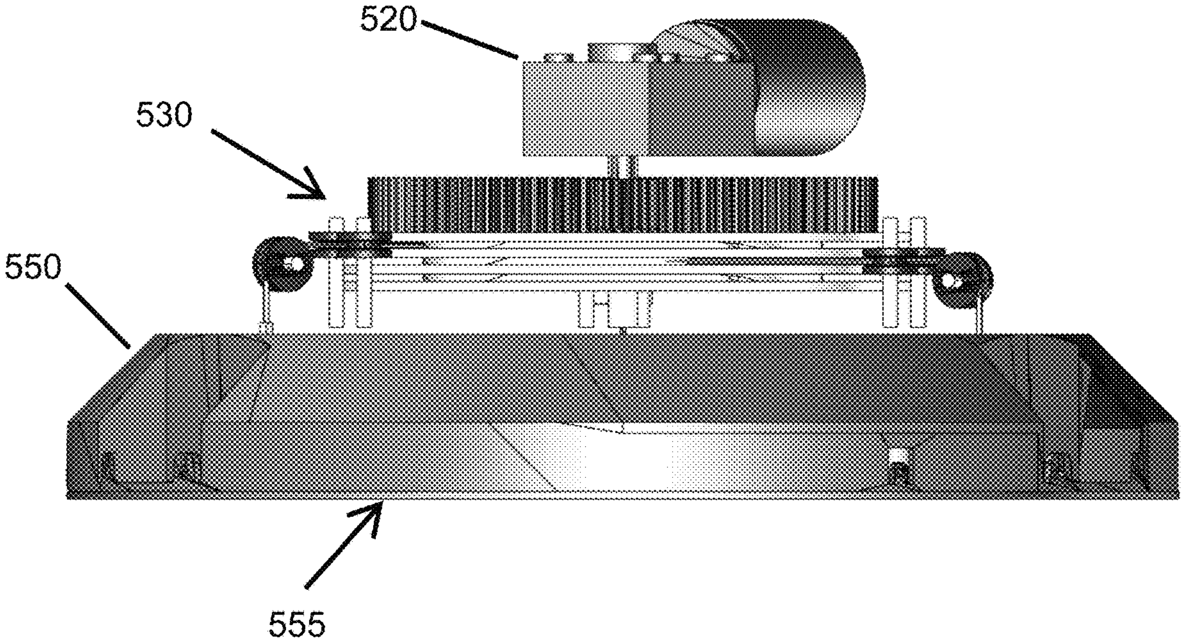
FIG. 31 shows relative positions of certain components of an exemplary device (motor, turntable, gears, guides and middle bezel) which enable the raising and lowering of the movable component.
Figure 32:
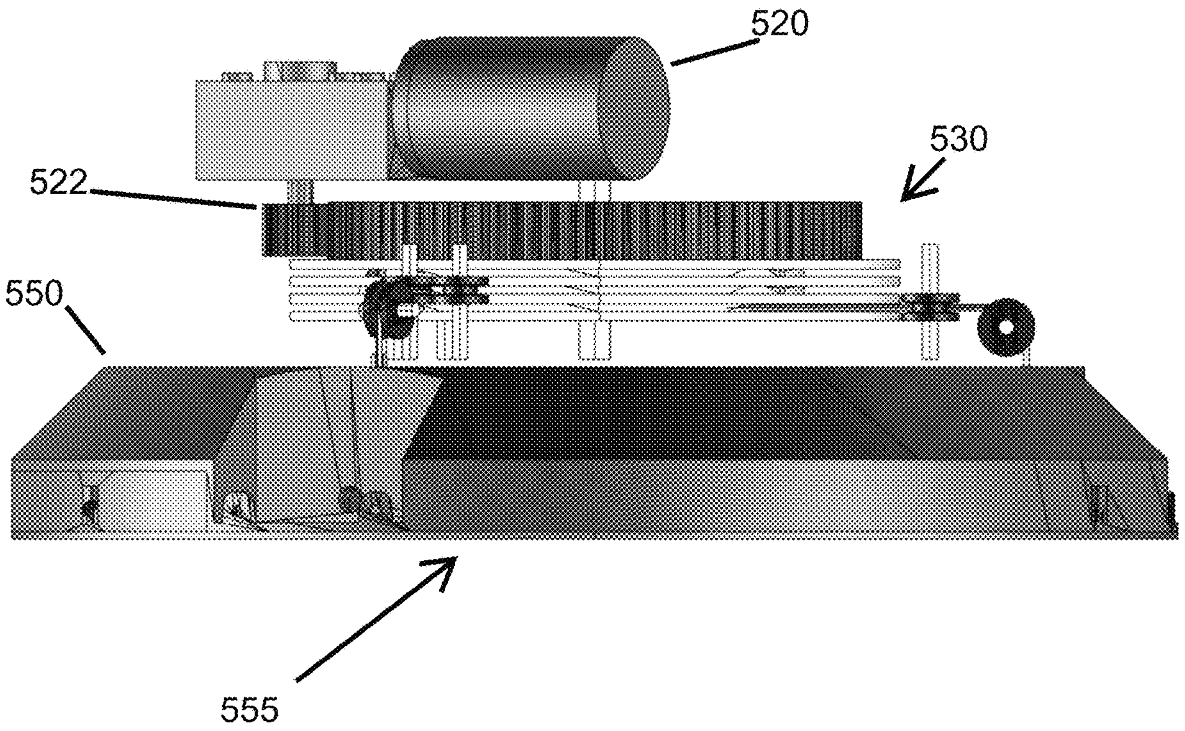
FIG. 32 This embodiment is a rotated view of FIG. 31, exemplifying a view of one of three molded indentations in the housing into which a safety mechanism may be mounted.
Figure 33:
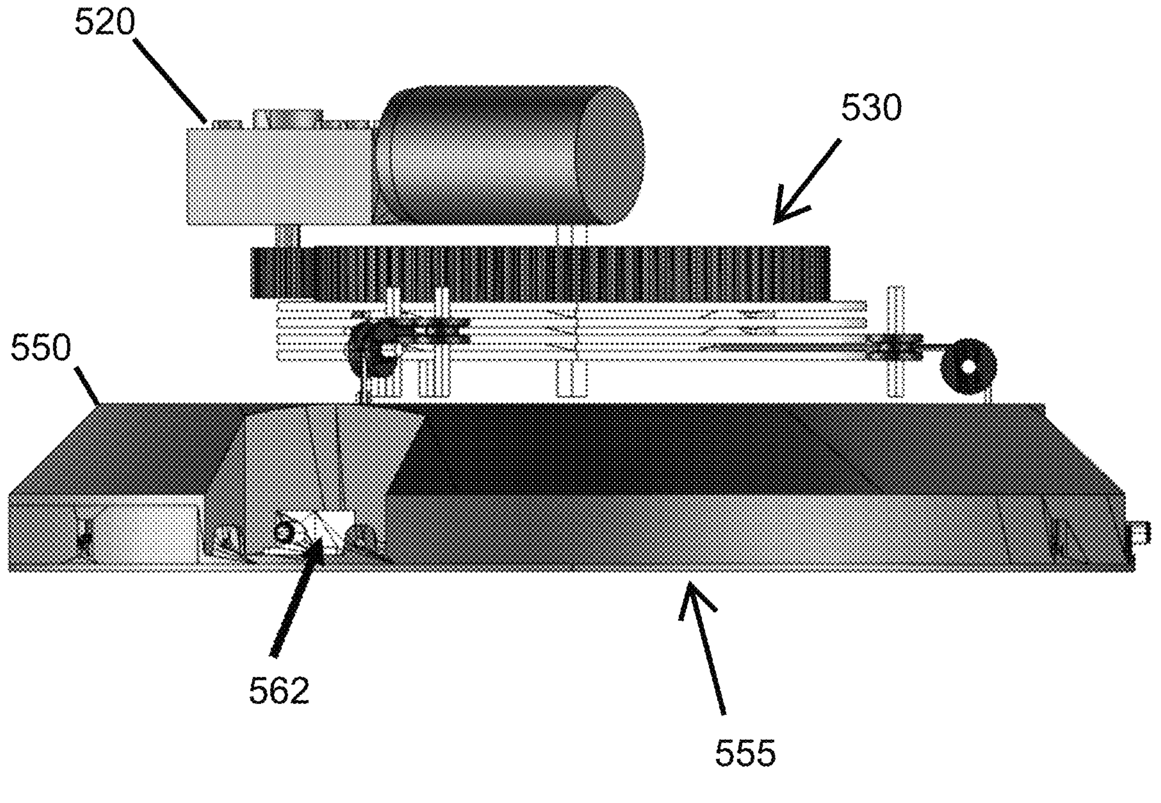
FIG. 33 shows an exemplary embodiment of FIG. 32 with an electromagnet (safety piston) shown.
Figure 34A:
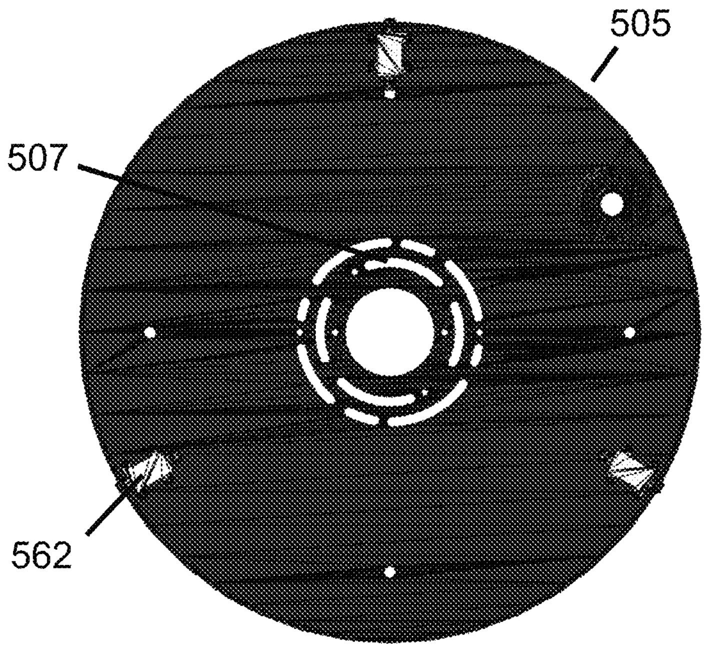
FIG. 34A shows a main housing which includes a universal mounting plate, allowing for fastening of the unit to a junction box in the ceiling and ceiling joists if required.
Figure 34B:
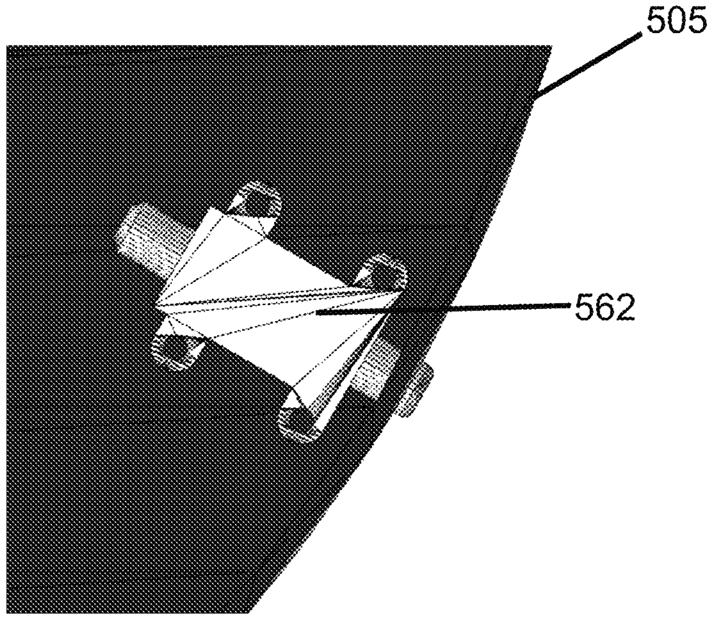
FIG. 34B shows a main housing engaging with an electromagnet/safety piston.

FIGS. 31-33 depict views of exemplary embodiments showing the turntable 530 in spatial relationship to a middle bezel 550 that houses the movable component 555 when the movable component 555 is retracted into the middle bezel 550. The movable component 555 may be docked (retracted) into, or undocked (descended) from the stationary middle bezel 550 of the stationary component 500 by the turning of the turntable 530 spool by the motor 520 and more particularly the motor gear 522 engaged with the gear of the turntable 530. A safety piston 562 may be mounted on a portion of the middle bezel 550 to engage with the movable component and/or stationary component 500 to keep the movable component locked in a docked/retracted state. The piston mechanism 562 may be an electromagnetic piston mechanism. Alternatively, the piston mechanism 562 may be substituted for any safety mechanism which functions to keep the movable component FIG. 34A shows an exemplary main housing 505 which includes a universal mounting plate 507 allowing for fastening of the unit to a junction box in the ceiling and/or ceiling joists if required. In an embodiment, a portion of the safety piston 562 may extend through a portion of the main housing 505 in the docked state. In an alternative embodiment, the safety piston 562 may be positioned in any manner so as to engageably lock the movable component in a docked state when the movable component is fully retracted into and engaged with the stationary component. In an embodiment, when the lower unit is fully raised, the male portion of the piston will fire into a female receptacle in the movable component 555, the other end protruding through the main housing 505.

Figure 35:
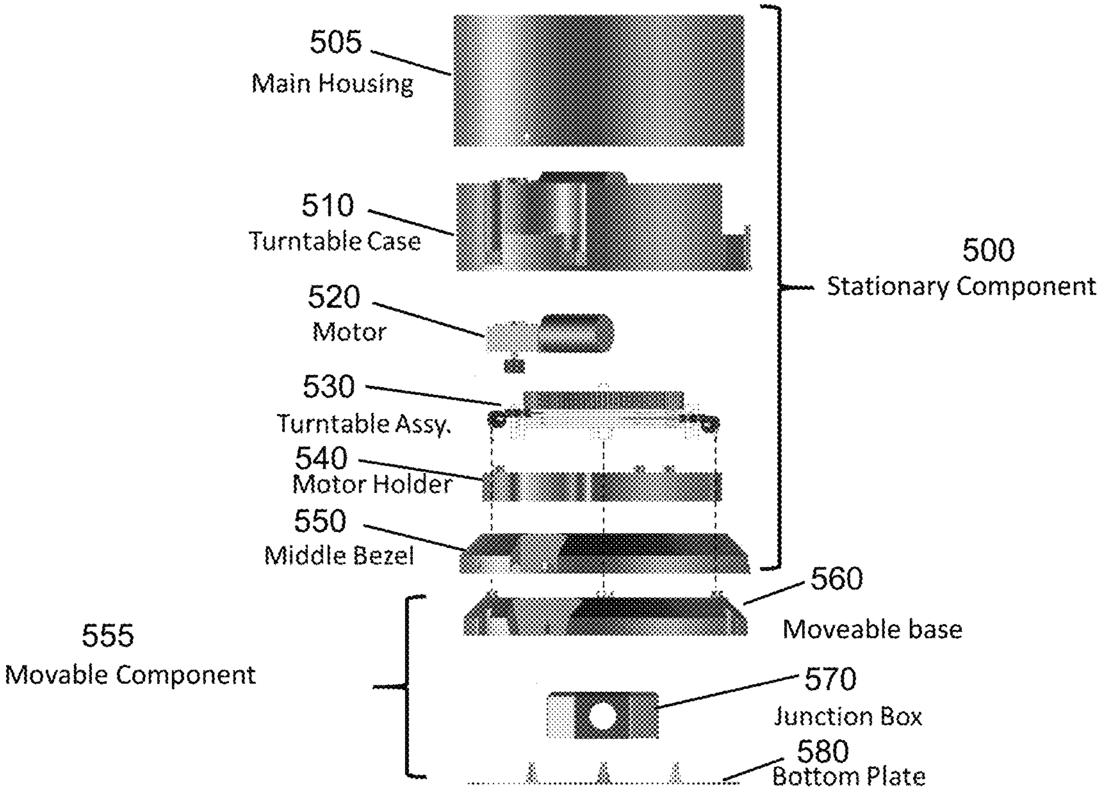
FIG. 35 depicts an exploded view of an exemplary embodiment.

FIG. 35 depicts an exploded view of an exemplary embodiment. The main housing 505 is generally mounted to a ceiling and/or junction box and is the point through which home electrical power enters the device. A turntable case 510 may be coupled with or inserted into the main housing 505 to support the turntable 530 and motor 520. And additional motor holder or turntable support 540 may be present underneath the turntable assembly 530. A middle bezel 550 may be the lower-most portion of the stationary component and generally allows for the docking of the movable component to the stationary component. In some embodiments, docking may include a releasable electrical connection between the stationary component and the movable component only when the movable component is docked in the stationary component. In some embodiments, the electrical connection is provided by an electrical connector on the stationary component which is complementary to an electrical connector on the movable component. When the electrical connectors are engaged in the docked state, the device generally provides power from the home power source entering the main housing 505 through to the junction box 570 on the movable component. In this manner, any electrical fixture attached to the movable component may be powered in the docked state. It should be noted that an attached electrical fixture is not an essential element in some embodiments even if an attached electrical fixture is recited—the attached electrical fixture may simply mean that electrical power is provided to the movable component that could power an attached electrical fixture, if indeed attached.

Figure 36A:
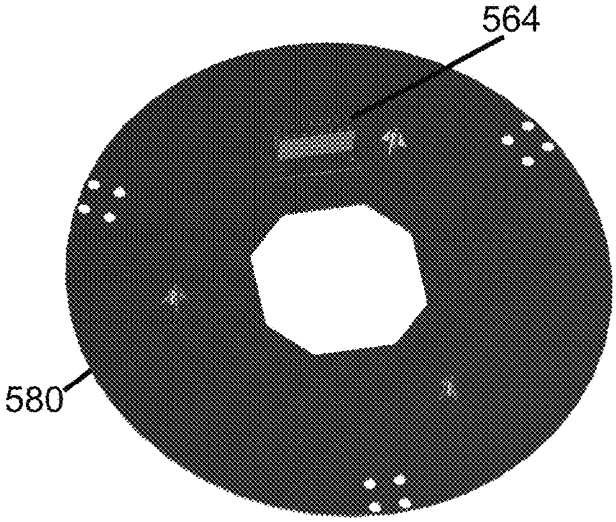
FIGS. 36A (bottom) and 36B (bottom with middle bezel) show an electrical connector on the movable component which is complementary to an electrical connector on the stationary component, and which may provide power to the movable component when the movable component is physically and electrically engaged with the stationary component.
Figure 36B:
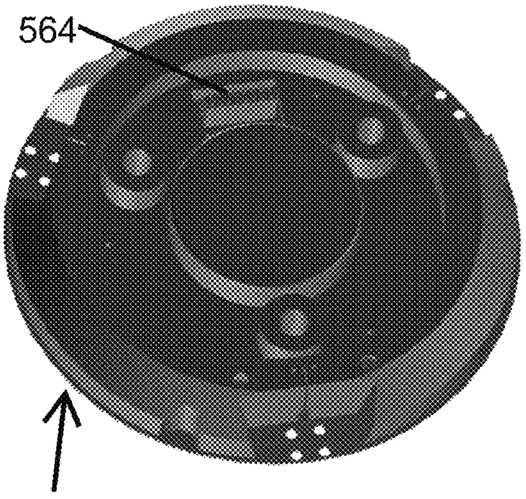
FIG. 36C This embodiment is a view of the bottom from below, showing the junction box into which a fan/light or other fixture may be installed.
Figure 36C:
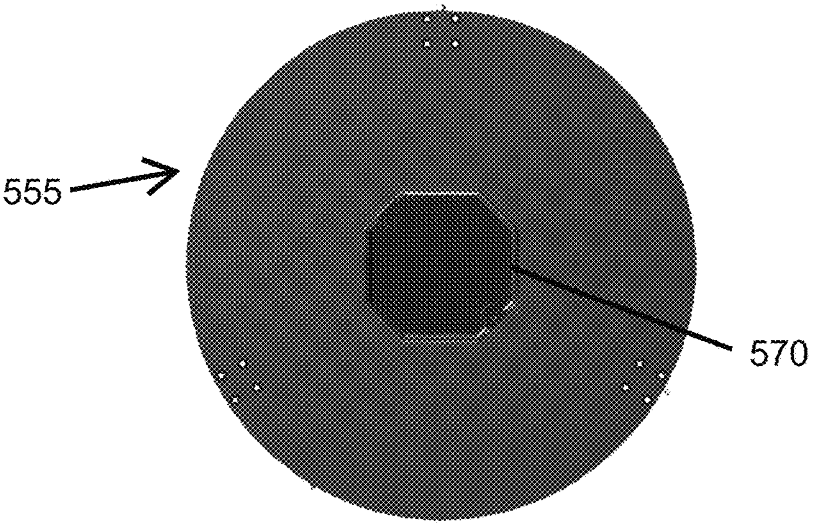
Figure 37:
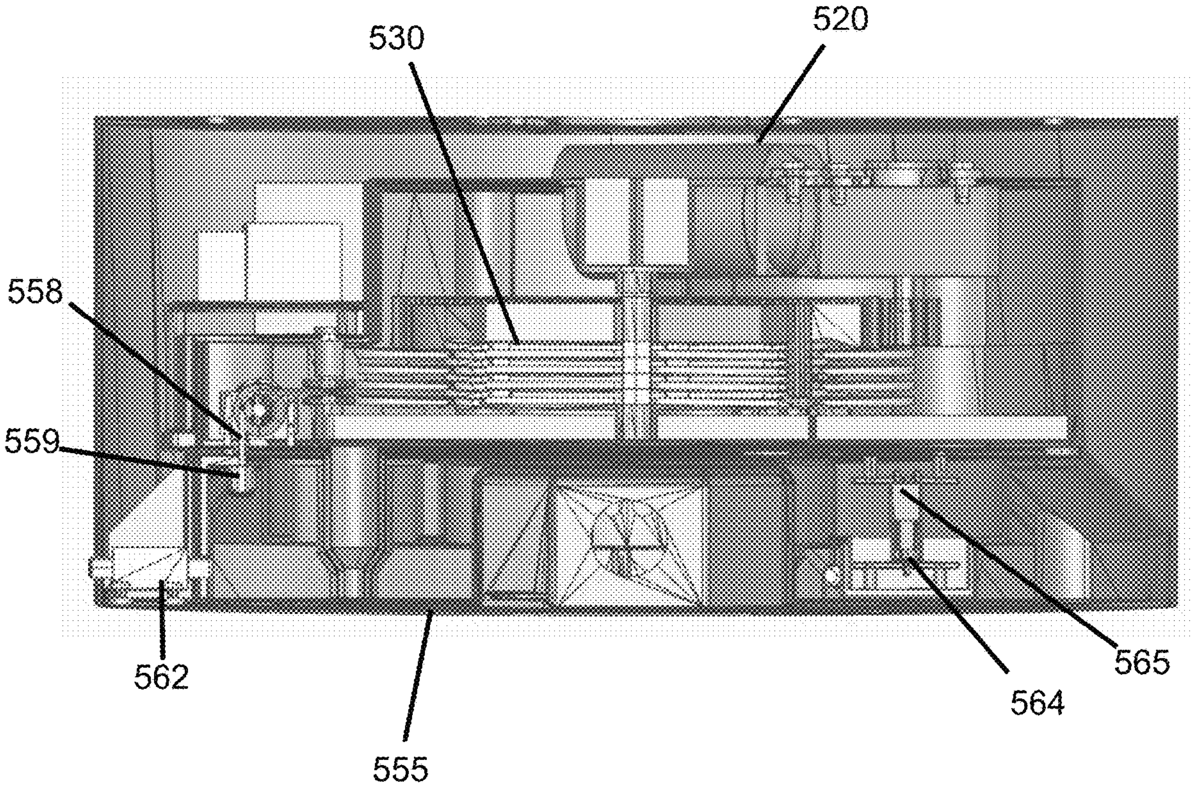
FIG. 37 This is a cross section of the descendible/movable component nested into the stationary component when fully retracted.

FIGS. 36A (bottom) and 36B (bottom with middle bezel) show an exemplary embodiment of an electrical connector 564 attached to a bottom plate 580 and protruding through to be accessible from a top of the movable component 555. The electrical connector 564 may be positioned such that it will releasably engage with a complementary connector on the stationary component 500. FIG. 36C is an exemplary bottom view of the movable component showing the junction box into which a fan/light or other fixture may be installed. The junction box will replicate the wiring and installation paradigm of the standard OEM junction box in the ceiling FIG. 37 shows an exemplary simplified cross section of the descendible/movable component nested into the stationary component when fully retracted. In this embodiment, all components fit inside the main housing such that from the outside it appears to be a solid cylinder from the side and below. From this view, the complementary and releasably engageable connectors 564 on the movable component and 565 on the stationary component are shown in their engaged state because the movable component is docked. In the engaged state, the input power into the stationary component will be supplied to the junction box on the movable component.

Figure 38A:
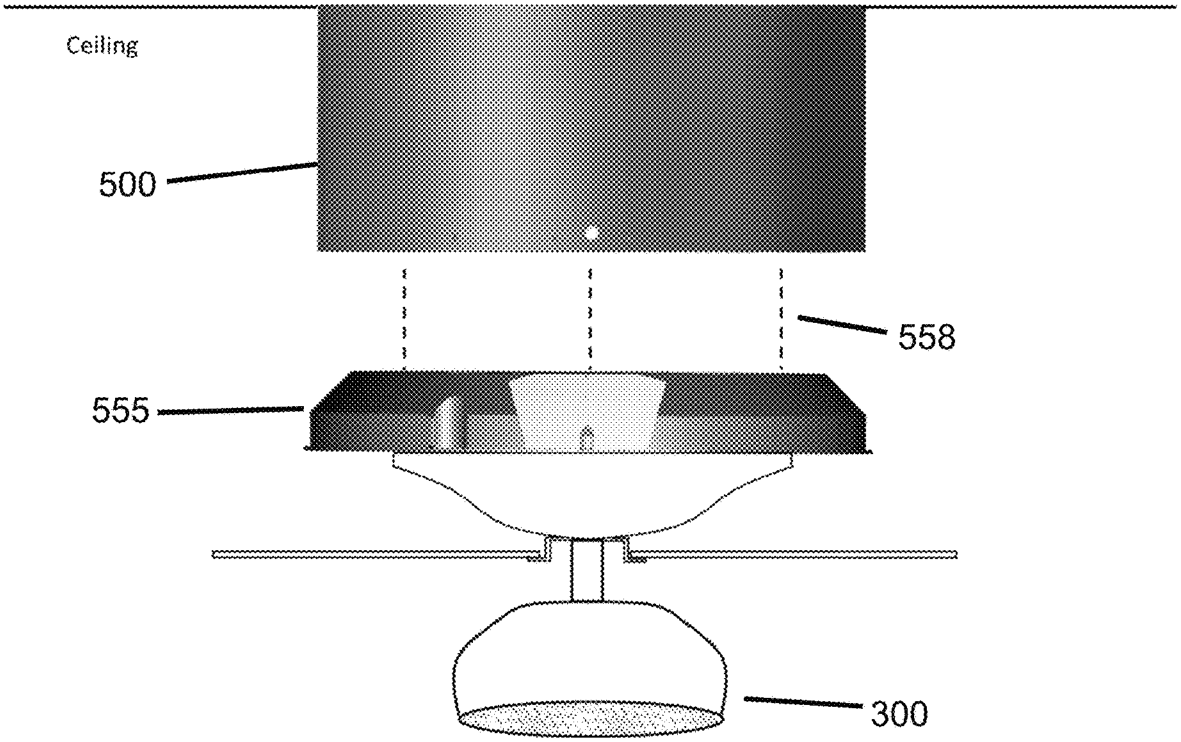
FIG. 38A shows an embodiment of a movable component with attached electrical fixture being undocked from the stationary component.
Figure 38B:
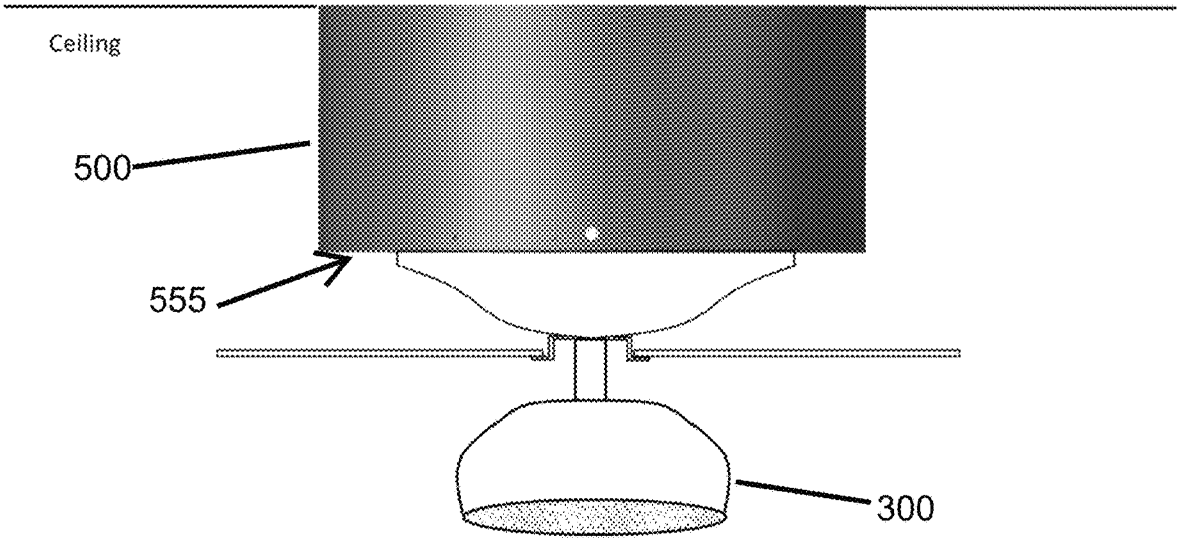
FIG. 38B shows an embodiment of the movable component with an attached electrical device being docked/nested in the stationary component.

FIG. 38A shows an exemplary embodiment of a movable component with attached electrical fixture being undocked from the stationary component. This embodiment shows the bottom descended with a fan/light installed. The three cables are spaced equidistant from each other which keeps the bottom both balanced and parallel to the main housing. The unit is advantageously shown installed on the ceiling as an aftermarket unit, not requiring significant drywalling or plastering, and/or structural work to install the unit. It is contemplated that alternative embodiments may be configured to install partly or fully within the ceiling. FIG. 38B shows an embodiment of the movable component with attached electrical fixture being docked/nested in the stationary component. This embodiment shows a fan/light installed to the bottom, which is fully retracted into the middle bezel/main housing, thus the unit appears to be a solid cylinder onto which the fan/light is installed.

Various further configurations of the disclosed components are contemplated, such as built-in units which are concealed in the ceiling in-between ceiling joists. For example, a turntable may be incorporated in a device held within a ceiling or above a ceiling. Various configurations may be contemplated for mounting on a vertical wall, such as devices which tilt from the wall prior to descending or ascending. The present disclosure also encompasses methods of use of any of the foregoing embodiments.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

EQUIVALENTS

The invention can be embodied in other specific forms without departing from the spirit or essential characteristics thereof. The foregoing embodiments are to be considered in all respects illustrative rather than limiting on the invention described herein. Furthermore, it should be noted that the figures illustrating the various embodiments are not necessarily to scale, but are shown as such for convenience and ease of illustration. In the various embodiments of the present invention, where the term comprises is used with respect to the recited components or methods, it is also contemplated that the invention consists essentially of, or consists of, the recited components or methods. Furthermore, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

Furthermore, it should be recognized that in certain instances an article of manufacture can be described as being composed of the components prior to assembly or incorporation into the article of manufacture.

What is claimed is:

1. An electrical fixture accessibility device comprising:

a. a stationary component comprising:

a housing having a mounting plate mountable to a flat or angled surface, the housing at least partially enclosing:

a multi-channel spool comprising a plurality of channels;

a plurality of support cables, respective first ends of the plurality of support cables being associated with a respective one of the plurality of channels of the multi-channel spool;

a drive mechanism coupled to the multi-channel spool, wherein the drive mechanism is configured to rotate the spool to unwind or wind the plurality of support cables from their respective channels; and a first electrical connector, and b. a movable component comprising:

respective connections to respective second ends of the plurality of support cables; and a second electrical connector releasably engageable with the first electrical connector, wherein an axis of rotation of the multi-channel spool is oriented substantially perpendicular to the mounting plate of the housing.

2. The electrical fixture accessibility device of claim 1, wherein the mounting plate of the housing includes a junction portion for physically and electrically coupling the stationary component to an electrical junction box.

3. The electrical fixture accessibility device of claim 1, wherein the movable component is movable in a direction descending from the surface on which the stationary component is mounted when the drive mechanism rotates the spool to unwind the support cables, and wherein the movable component is movable in a direction ascending toward the surface on which the stationary component is mounted when the drive mechanism rotates the spool to wind the support cables.

4. The electrical fixture accessibility device of claim 1 wherein the second ends of the plurality of support cables move synchronously with rotation of the multi-channel spool to maintain a substantially same length of each support cable extended from the stationary component, such that the movable component remains substantially parallel to the surface to which the stationary component is mounted.

5. The electrical fixture accessibility device of claim 1 wherein the moveable component is moveable between (i) a docked state in which the moveable component is electrically engaged with the stationary component and (ii) an undocked state in which the moveable component is electrically disengaged from the stationary component.

6. The electrical fixture accessibility device of claim 5, wherein the movable component comprises a junction configured for physical and electrical attachment to an electrical fixture, wherein the attached electrical fixture is electrically coupled with the second electrical connector to provide power to the electrical fixture in the docked state.

7. The electrical fixture accessibility device of claim 1, wherein the plurality of channels of the multi-channel spool are recessed into a body of the multi-channel spool to maintain separation of a respective support cable from the other support cables.

8. The electrical fixture accessibility device of claim 7, wherein the recessed channels are separated by a material of the multi-channel spool body.

9. The electrical fixture accessibility device of claim 1, wherein the movable component further includes a junction box electrically connected to the second electrical connector and adapted for coupling of an electrical fixture to the movable component.

10. The electrical fixture accessibility device of claim 1, wherein the plurality of support cables laterally exit the multi-channel spool at different locations about the circumference of the multi-channel spool.

11. The electrical fixture accessibility device of claim 1, said plurality of support cables comprising three or more support cables, wherein the three or more support cables exit the stationary component in a symmetric, circular arrangement to maintain a stable orientation of the movable component.

12. The electrical fixture accessibility device of claim 1, wherein the respective connections to respective second ends of the plurality of support cables include one or more of a press fitting attachment, a screw fitting attachment, a clamp attachment, or a weld attachment.

13. The electrical fixture accessibility device of claim 12, wherein the respective connections to respective second ends of the plurality of support cables include respective screw fitting attachments to engage the respective second ends of the support cables with the movable component.

14. The electrical fixture accessibility device of claim 12, wherein relative lengths of portions of the support cables exiting the stationary component are adjustable.

15. A multi-cable hoist comprising:

a housing having a mounting plate mountable to a flat or angled surface, the housing at least partially enclosing:

a multi-channel spool comprising a plurality of channels;

a plurality of support cables, respective first ends of the plurality of support cables being associated with a respective one of the plurality of channels of the multi-channel spool; and a drive mechanism coupled to the multi-channel spool, wherein the drive mechanism is configured to rotate the spool to unwind or wind the plurality of support cables from their respective channels to descend or raise a second end of the plurality of support cables, wherein an axis of rotation of the multi-channel spool is oriented substantially perpendicular to the mounting plate of the housing.

16. The multi-cable hoist of claim 15, wherein the second ends of the plurality of support cables move synchronously with rotation of the multi-channel spool to maintain a substantially same length of each support cable extended from the multi-cable hoist such that an object coupled to the second ends of the support cables remains substantially parallel to the surface to which the multi-cable hoist is mounted.

17. The multi-cable hoist of claim 15, further comprising a guide associated with each of the plurality of support cables to direct their respective cables in a direction substantially perpendicular to the ground.

18. The multi-cable hoist of claim 15, further comprising a movable component coupled with one or more second ends of the cables, the movable component being docked to a hoist body housing the hoist, when the second ends of the support cables are fully raised.

19. The multi-cable hoist of claim 18, wherein the hoist body and movable component comprise complementary and releasably engageable electrical connectors which supply power, in an engaged state, to the movable component when the movable component is docked to the hoist body.

20. The multi-cable hoist of claim 15, further comprising a respective support cable guide for the respective channels of the plurality of channels, wherein the support cable guides align the respective support cables to wind into their respective channels.

21. The multi-cable hoist of claim 20, further comprising a respective directional guide adjacent each support cable guide, wherein the directional guides direct the respective support cable toward the ground.

22. The multi-cable hoist of claim 15, wherein the plurality of channels of the multi-channel spool are recessed into a body of the multi-channel spool to maintain separation of a respective support cable from the other support cables.

23. The multi-cable hoist of claim 22, wherein the recessed channels are separated by a material of the multi-cable spool body.

24. The multi-cable hoist of claim 15, wherein the plurality of support cables laterally exit the multi-channel spool at different locations about the circumference of the multi-channel spool.

25. The multi-cable hoist of claim 15, said plurality of support cables comprising three or more support cables, wherein the three or more support cables exit the multi-cable hoist in a symmetric, circular arrangement to maintain a stable orientation of an object coupled to the second ends of the three or more support cables.

* * * * *